(12) United States Patent
Fujiwara

(10) Patent No.: US 7,234,600 B2
(45) Date of Patent: Jun. 26, 2007

(54) SLUDGE SCRAPING AND COLLECTING APPARATUS

(75) Inventor: Michihiro Fujiwara, Osaka (JP)

(73) Assignee: Fujiwara Sangyo Kabushiki Kaisha, Osaka (JP)

(*) Notice: Subject to any disclaimer, the term of this patent is extended or adjusted under 35 U.S.C. 154(b) by 52 days.

(21) Appl. No.: 11/009,573

(22) Filed: Dec. 10, 2004

(65) Prior Publication Data

US 2006/0124539 A1    Jun. 15, 2006

(51) Int. Cl.
*B01D 21/18* (2006.01)

(52) U.S. Cl. .................... 210/527; 210/525

(58) Field of Classification Search ............. 210/523, 210/524, 525, 527
See application file for complete search history.

(56) References Cited

U.S. PATENT DOCUMENTS

| | | | | |
|---|---|---|---|---|
| 1,911,008 | A | * | 5/1933 | Withington ............. 210/527 |
| 1,918,742 | A | * | 7/1933 | Elrod ..................... 210/527 |
| 2,305,929 | A | * | 12/1942 | Lund ..................... 210/527 |
| 3,872,005 | A | * | 3/1975 | Baker .................... 210/525 |
| 4,172,040 | A |   | 10/1979 | Bona et al. |
| 4,247,400 | A |   | 1/1981 | King et al. |
| 4,486,309 | A | * | 12/1984 | Krodel ................... 210/527 |
| 4,663,042 | A |   | 5/1987 | Rasper et al. |
| 4,950,398 | A |   | 8/1990 | Weigand |
| 5,200,079 | A | * | 4/1993 | Schwartz et al. ......... 210/525 |
| 5,269,928 | A | * | 12/1993 | Leikam .................. 210/525 |
| 5,478,471 | A |   | 12/1995 | Fujiwara |
| 6,199,704 | B1 |   | 3/2001 | Fujiwara |
| 6,220,455 | B1 |   | 4/2001 | Tuomikoski |
| 6,536,606 | B2 |   | 3/2003 | Schneider et al. |

* cited by examiner

*Primary Examiner*—Christopher Upton
(74) *Attorney, Agent, or Firm*—Akin Gump Strauss Hauer & Feld LLP

(57) ABSTRACT

The present invention provides a sludge or the like scraping and collecting apparatus. This apparatus has a whole structure more simplified and can realize a cost-down. Further, it is advantageously installed.

The scraping and collecting apparatus comprises a carriage having a main body formed from a single long member constant in section in a front and rear direction. The carrier main body has a front end and a rear end provided with sludge scrapers. These front and rear sludge scrapers are adapted to be able to simultaneously and interlockingly move by a pulling and conveying means through a longitudinally and interlockingly moving member which advances and retreats in parallel with the carriage main body.

4 Claims, 23 Drawing Sheets

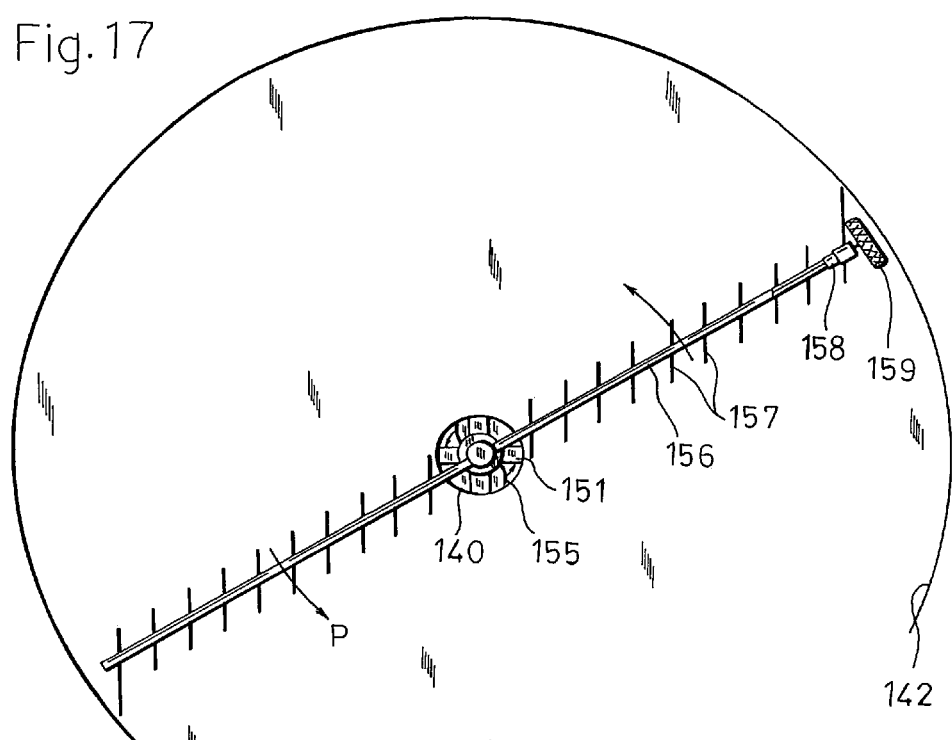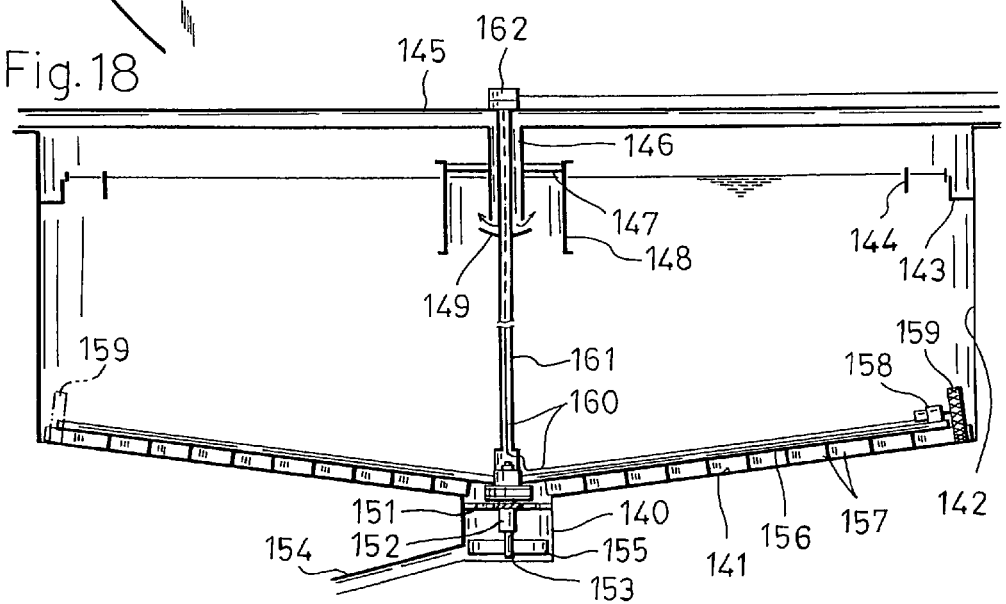

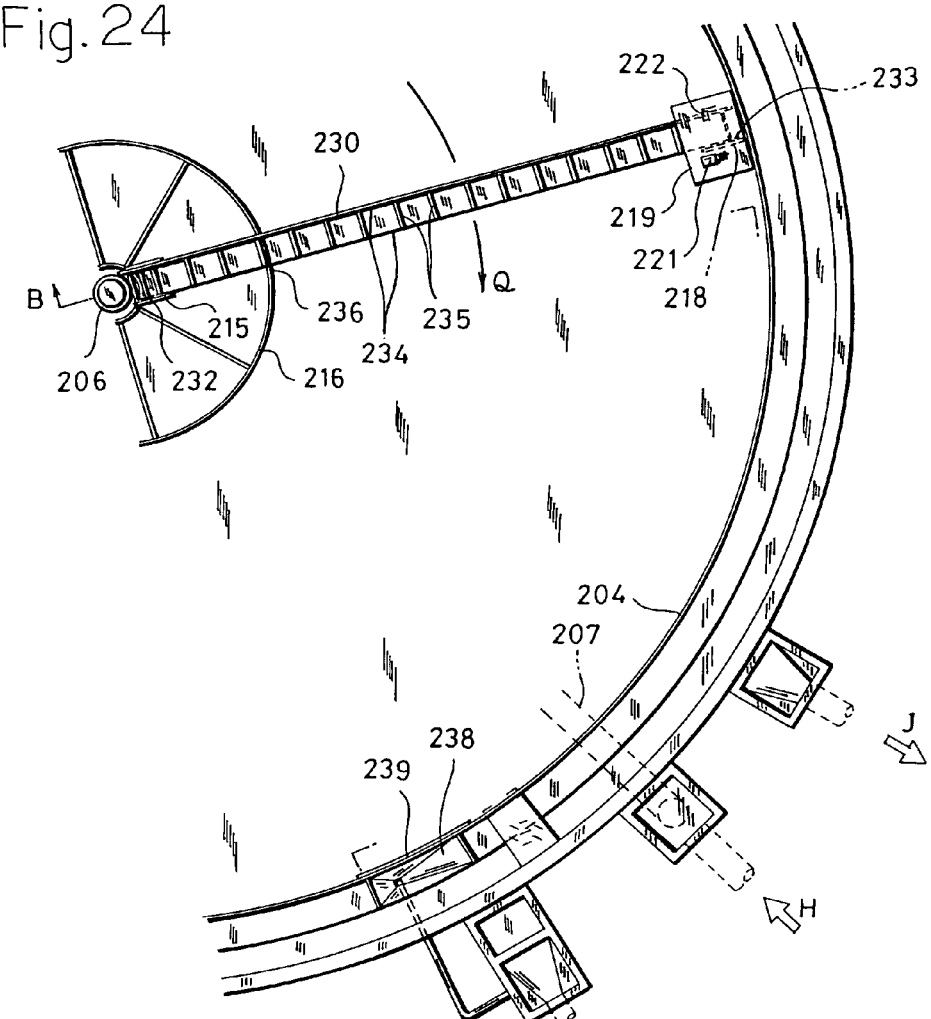
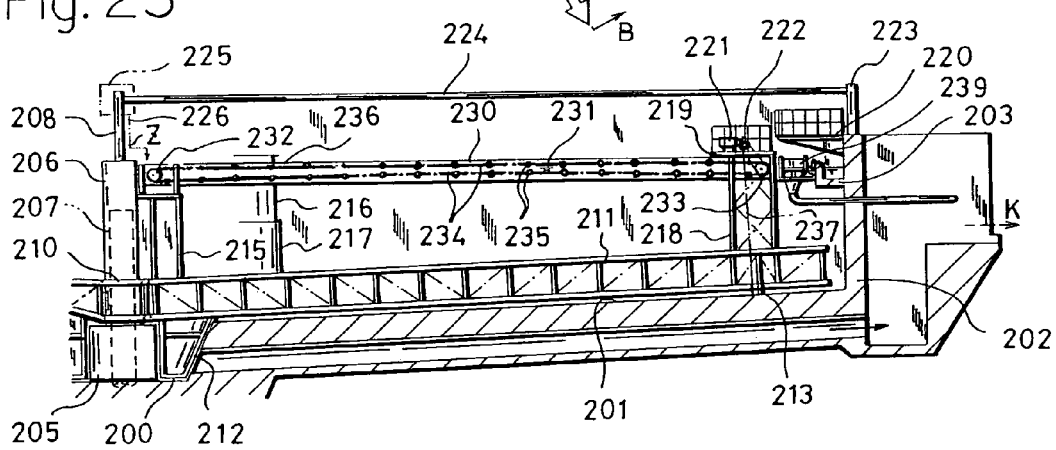

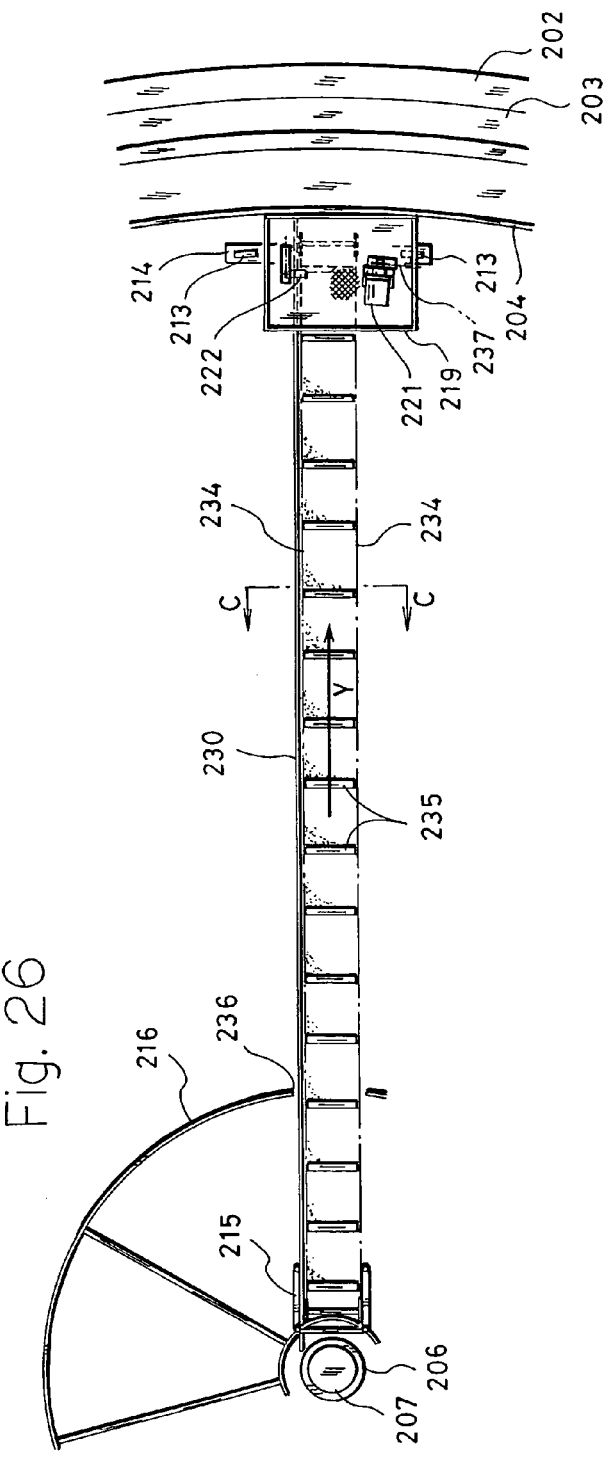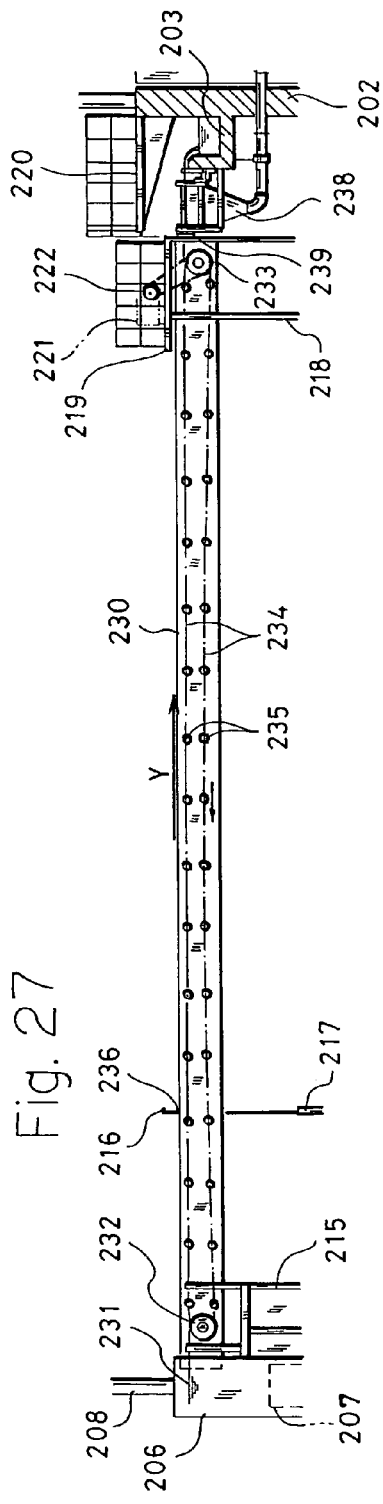

SLUDGE SCRAPING AND COLLECTING APPARATUS

BACKGROUND OF THE INVENTION

This invention relates to a sludge scraping and collecting apparatus.

DESCRIPTION OF RELATED ART

As for a conventional sludge scraping and collecting apparatus, a processing basin such as a sedimentation basin, is equipped with a circulating chain having a number of flights arranged. The flights scrape and collect the sludge at a bottom of the basin while they are passing over the bottom of the basin and bring it into a sludge pit. However, because the conventional sludge scraping and collecting apparatus becomes complicated in structure and does not pay in the aspect of cost and so on, recently, instead of the above-mentioned conventional one, there emerges a sludge scraping and collecting apparatus which includes a carriage equipped with a vertically movable sludge scraper adapted to advance and retreat along guide rails laid on the bottom of the basin. This sludge scraping and collecting apparatus has an advantage that it has a simple structure and is produced at a relatively low cost.

The above-mentioned sludge scraping and collecting apparatus is generally provided with a carriage which has running wheels and can advance and retreat on the guide rails. It is driven from above the basin and made to advance and retreat by a pulling and conveying means such as a wire rope. While it advances and retreats, the sludge scraper equipped on the carriage is adapted to be switchable over between a vertical scraping and collecting position and a lifted-up return position.

Such sludge scraping and collecting apparatus has the guide rails arranged along both side walls and has a horizontally wide carriage provided over a space between these rails. Accordingly, the apparatus becomes so large that it tried in vain to reduce the cost.

Further, the convention sludge scraping and collecting apparatus has a carriage short in a front and rear direction. Therefore, it advances and retreats by a long stroke since the processing basin has a long distance. This results in increasing the scraping and collecting cycle in time and, for example, entails a fear that it cannot satisfactorily deal with a large amount of sanitary sewage when the sewage has flowed into the processing basin. Thus the carriage is elongated to have its front end and rear end provided with sludge scrapers in an attempt to scrape and collect the sludge present at the rear portion toward the front portion separately several times so as to fall it into the pit.

However, in this case, if the carriage main body is fundamentally in the shape of a large rectangular frame in plan, there was a limit in not only simplifying the structure of the whole device but also in reducing the cost.

In the case where the sludge scraping and collecting apparatus of the type that switches over the sludge scraper from the upper position to the lower position and vice versa as mentioned above is, for example, installed with a final sedimentation basin taken as an intended object, the sludge scraper easily hoists the sludge when it advances since it has been conventionally set as high as at least 600 mm. Thus there is imagined a likelihood of impeding the decontamination treatment by inducting the hoisted sludge portion of high floatability out of an overflow weir for supernatant water, which is positioned downstream thereof, along with the flow in the basin caused by the easy hoisting.

In order to solve the above-mentioned problems, the present invention has an object to provide a sludge or the like scraping and collecting apparatus which has a whole structure more simplified and can, in fact, reduce the cost and advantageously be installed. It has another object to provide a sludge or the like scraping and collecting apparatus which prevents the hoisting of the sludge so as to improve the decontamination efficiency and effectively conducts the decontamination treatment by returning the sludge while it is being activated.

It has still another object to provide a sludge or the like scraping and collecting apparatus which more simplifies the rotation system of a rake arm installed in a circular sedimentation basin and assures a reliable operation at a lower cost.

In order to accomplish the above objects, the invention sets forth a sludge or the like scraping and collecting apparatus which comprises a guide rail laid on a bottom of a processing basin, rectangular in plan, such as a sedimentation basin and aeration reservoir, having side walls opposing to each other, front and rear end walls perpendicular to these side walls and one end provided with a pit, so as to pass through a mid portion between the both side walls in a longitudinal direction which is a front and rear direction, and a carriage having running wheels and provided on the guide rail so that it can reciprocally run in the front and rear direction. The carriage is provided with a sludge scraper which scrapes and collects the sludge to be deposited on the left and right sides of the guide rail toward the pit so that the sludge scraper is switchable over vertically and rotatably from a lowered scraping and collecting position to a lifted-up return position and vice versa. There is disposed above the processing basin a driving portion which continuously rotates a driven wheel and switches over its rotation direction to a normal one or a reverse one and vice versa. The sludge scraper is rotated and switched over to either of the upper position and the lower position through a pulling and conveying means wrapped around the driven wheel and a direction-conversion wheel arranged in the processing basin. Then the carriage is pulled forwardly or rearwardly.

Another aspect of the invention described above is that the sludge scrapers are arranged at least at the front and rear ends of the carriage so that the sludge which has been scraped and collected and has been moved forward by the sludge scraper at the rear end is further scraped and collected and is moved forward by the sludge scraper arranged ahead of the sludge scraper at the rear end, thereby scraping off the sludge into the pit.

A further aspect of the invention described above is that the carriage has a main body formed from a single long member constant in section in the front and rear direction and the carriage main body has a front end and a rear end at which the sludge scrapers are arranged. These front and rear sludge scrapers are simultaneously and interlockingly moved by the pulling and conveying means through a longitudinal interlockingly moving member which advances and retreats in parallel to the carriage main body.

Yet another aspect of the invention described above is that the carriage main body is formed from a channel member, an angled member, an angular pipe and the like, and the longitudinal interlockingly moving member passes through a space within the groove or the pipe.

Further, another aspect of the invention described above is that the guide rail defines a continuous inner space longitudinally thereof, through which the pulling and conveying means passes.

In still another aspect of the invention described above the sludge scraper has a vertical height within a range of 150 mm to 400 mm and adjustable so as to meet a deposit state of the sludge in the processing basin.

Another aspect of the invention described above is where the front and rear sludge scrapers define a longitudinal space therebetween in which an auxiliary scraper is arranged.

Yet another aspect of the invention described above is where a support column is made to stand up from the carriage and a scum scraping and collecting plate which scrapes and collects scum on the water in one direction is provided through an upper end of the support column so that it floats and sinks.

A different embodiment of the invention is a sludge or the like scraping and collecting apparatus which comprises a carriage provided on a bottom of a processing basin, rectangular in section, such as a sedimentation basin and aeration reservoir, having side walls opposing to each other, front and rear end walls perpendicular to these side walls and one end provided with a pit, so as to pass through a mid portion widthwise of the basin, a common shaft projecting from the carriage so as to extend in a left and right direction and running wheels of tire type provided at the left and right projections of the common shaft so as to be rotatable and rollable on the bottom of the basin. A sludge scraper is provided rotatably around the common shaft, around which the running wheels are also provided. The sludge scraper is lowered to take a scraping and collecting position for scraping and collecting the sludge toward the pit when it advances and is listed up to take a return position when it retreats. The carriage is arranged to be able to advance and retreat by a means for preventing run-out in the left and rear direction. There is disposed above the processing basin a driving portion which can continuously rotate a driven wheel and switches over its rotation direction to a normal one or to a reverse one and vice versa. The sludge scraper is rotated and switched over to either of the upper position and the lower position through a pulling and conveying means wrapped over the driven wheel and a direction-conversion wheel arranged in the processing basin. Then the carriage is pulled forwardly and rearwardly.

Another aspect of the embodiment of the invention discussed above is where the means for preventing the run-out in the left and rear direction comprises the guide rail laid on the widthwise mid portion of the bottom of the basin and a run-out preventing roller projecting from the carriage and extending along the guide rail.

Another embodiment of the invention is the sludge or the like scraping and collecting apparatus rotatably provided with a rake arm having a rake which scrapes and collects the sludge on a bottom surface of a circular sedimentation basin and falls it into a central pit, wherein the rake arm is rotated by a driven wheel equipped on the rake arm, which is rolled along the bottom of the basin while being forcedly rotated through a driving source and makes a circulation movement.

Another aspect of the invention discussed above is where the driven wheel is provided at a leading end of the rake arm and the driving source is also disposed on the rake arm.

Yet another aspect of the invention discussed above is where the rake arm is provided so that it is able to rotate around a pipe for introducing sanitary sewage which stands up from a mid portion of the basin through the central pit.

Still another aspect of the invention discussed above is where the driving source is installed rotatably above the water surface of the basin and is adapted so that its power is transmissible to the driven wheel.

A yet different embodiment of the invention is a sludge or the like scraping and collecting apparatus rotatably provided with a rake arm having a rake which scrapes and collects the sludge on a bottom of a circular sedimentation basin and falls it into a central pit and adapted to rotate over the water and to forward the floating scum outwardly and radially of the basin while scraping and collecting it so as to flow and remove it into a scum removing device. The scraping and collecting apparatus further includes, as a means for scraping and forwarding the scum radially and outwardly of the basin, a scraping and forwarding member able to circulate so that it scrapes and forwards the scum from a radially inward side of the basin to a radially outward side thereof while floating on the water of the basin and then rotates to retreat to the radially inner side.

A different aspect of the invention discussed above is where the means for forwarding the scum outwardly and radially of the basin has a rearward side in the rotation direction. There is arranged on the rearward side a scum scraper rotatable in the basin.

A different embodiment of the invention is a sludge or the like scraping and collecting apparatus which comprises an air introducing main conduit provided at an upper position from a bottom wall of a processing basin, rectangular in section, such as an aeration reservoir, having left and right side walls opposed to each other, front and rear end walls perpendicular to the side walls and one longitudinal end provided with a means for expelling the scraped and collected deposits, and installed so as to extend in parallel to the side walls. An air diffusing pipe projects from the main conduit while crossing it so as to extend toward the side wall and communicates with the main conduit. The scraping and collecting device scrapes and collects the deposits precipitated on the bottom wall of the processing basin such as the aeration reservoir. A guide rail is laid on the bottom wall so as to pass in a longitudinal direction, which is a front and rear direction, between the side walls. The guide rail has an upper portion provided with a framework so that the framework is able to run reciprocally in the front and rear direction and formed with an induction scraper of the fixed type and another scraper of the vertically switchable type. The induction scraper is adapted to scrape out the deposits precipitated in a region below the air diffusing pipe to an exterior area. The another scraper is lowered to scrape and forward the deposits precipitated on the bottom wall along with the deposits scraped out by the induction scraper and on the other hand, is lifted up to return rearwardly without scraping back the deposits.

BRIEF DESCRIPTION OF THE DRAWINGS

FIG. 17 is a cross sectional view showing an embodiment of a sludge scraping and collecting apparatus for a circular sedimentation basin;

FIG. 18 is a vertical sectional view of FIG. 17;

FIG. 24 is a plan view showing another embodiment of the sludge scraping and collecting apparatus for the circular sedimentation basin;

FIG. 25 is a sectional view taken along a line B—B in FIG. 24;

FIG. 26 is an enlarged and detailed view of FIG. 24;

FIG. 27 is a cross sectional view of FIG. 26;

MOST PREFERRED EMBODIMENT OF THE INVENTION

Hereinafter, the present invention is explained in detail with reference to illustrated embodiments.

Figure 1:
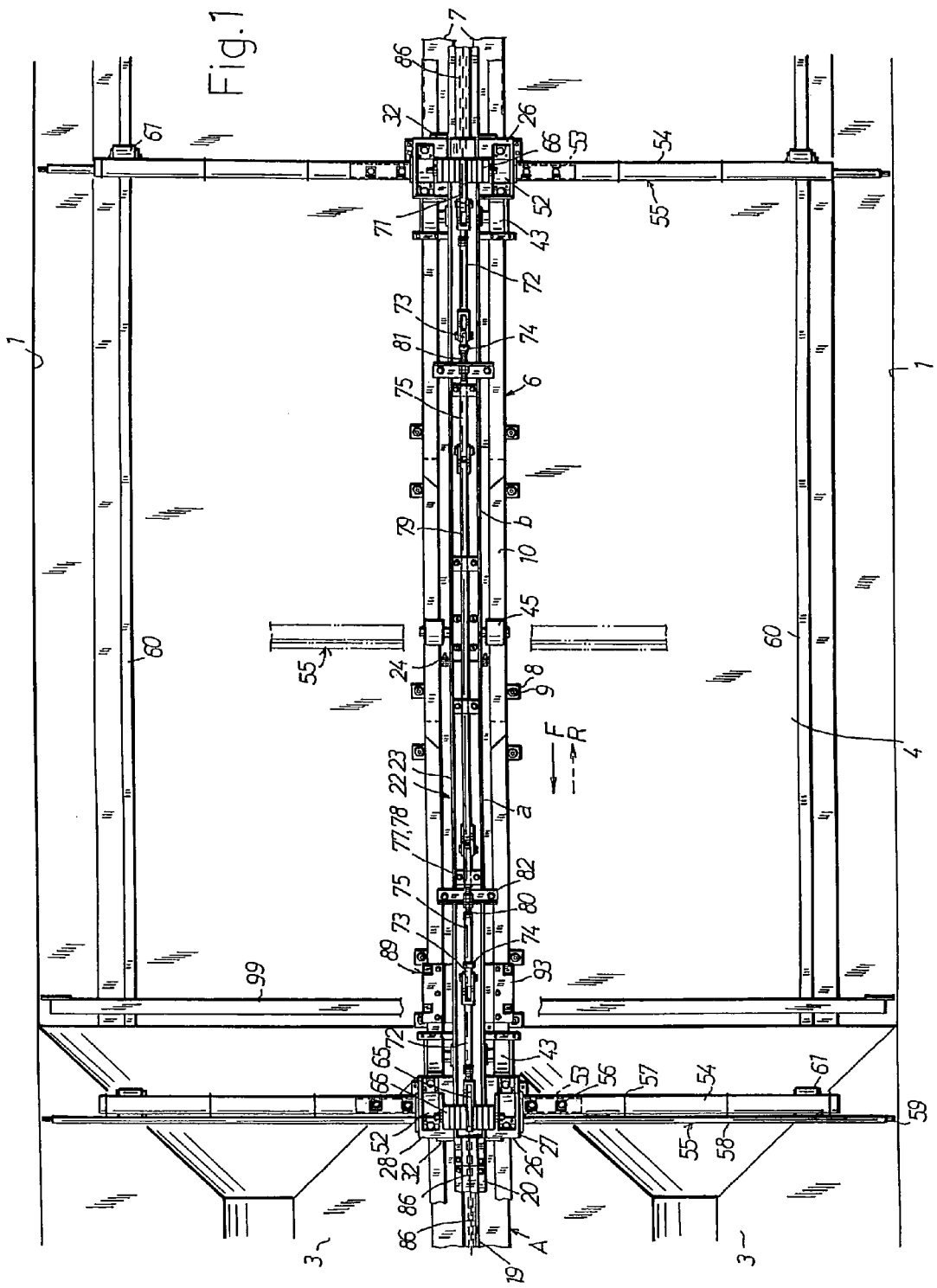
FIG. 1 is a plan view of a sludge scraping and collecting apparatus showing an embodiment of this invention.
Figure 2:
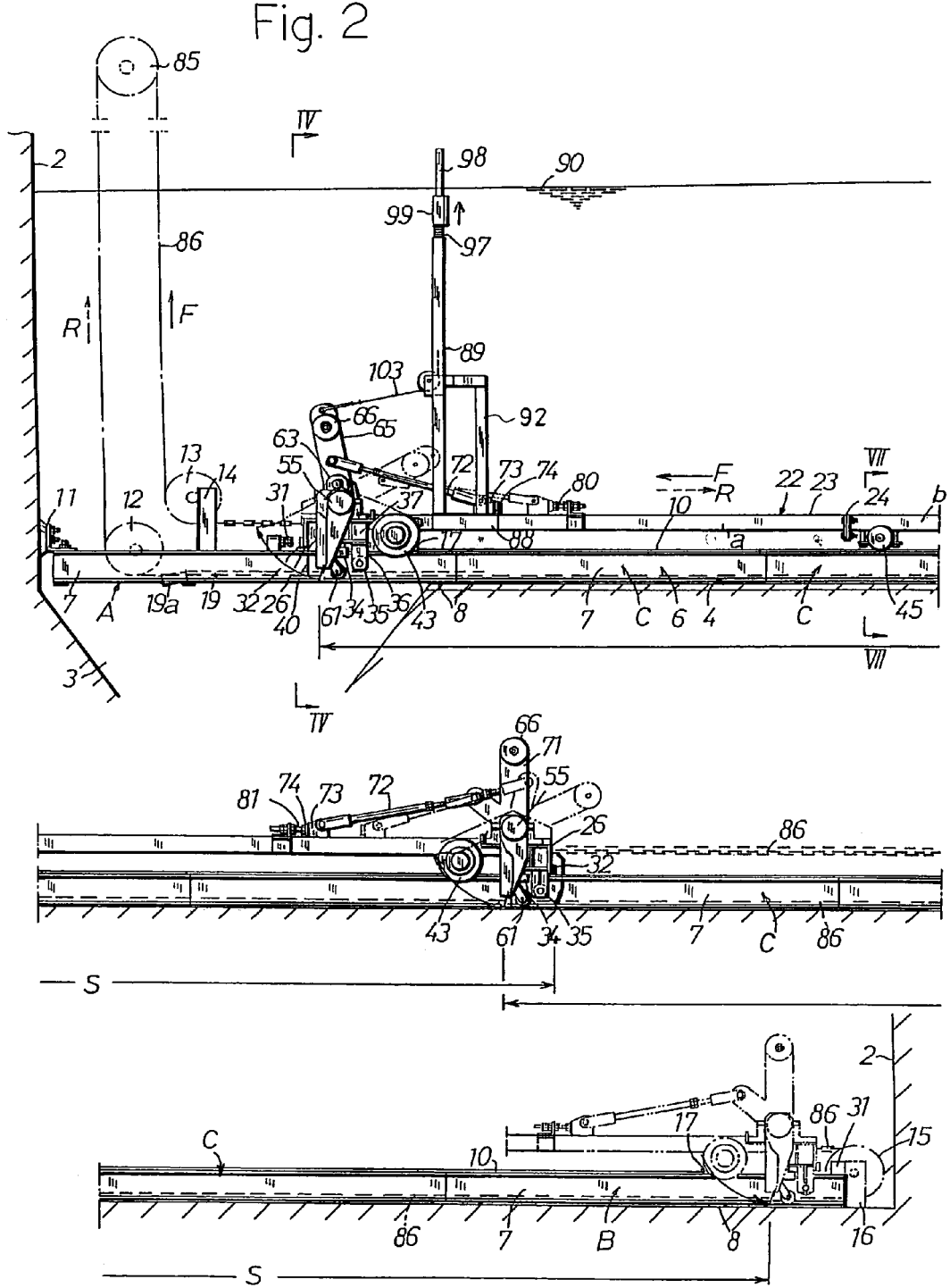
FIG. 2 is a left side view of FIG. 1.

FIGS. 1 to 7 show a preferred embodiment of the present invention. The embodiment has constructed a sludge scraping and collecting apparatus with a rectangular sedimentation basin taken as an intended object. FIG. 2 illustrates the apparatus by combining vertical three stages with each other because the paper is limited in size. These views constitute a view (of the apparatus) by connecting a middle stage view to a right side of an upper stage view as it is and then a lower stage view to a right side of the middle stage view as it is.

The sedimentation basin is provided with side walls 1 which oppose to each other in a right and left direction as shown by a plan view of FIG. 1 and a right side sectional view of FIG. 2. While a direction in which these side walls mutually oppose is taken as a width direction of the basin, a direction perpendicular to the width direction is deemed as a longitudinal direction thereof. Walls opposing to each other in the longitudinal direction are formed as a front end wall 2 and a rear end wall 2 as shown in FIG. 2. The end wall 2 as shown at the left end, one of the end walls, is provided with a flow-straightening portion which introduces sanitary sewage and is formed in the shape of being porous or the like. Formed at one end in the longitudinal direction (left end) are concave pits (sludge pits) 3 made to form a pair of left and right ones. A bottom 4 of the basin as shown in FIG. 2 is inclined downwardly by a very slight angle in a leftward direction in FIG. 2, although hardly seen in this Figure.

Numeral 6 designate a guide rail. The guide rail 6 passes through a mid portion of the width of the basin as shown in FIG. 1 and extends over the pits 3 from the right end in FIG. 2 so as to form a continuous long rail.

This guide rail 6 consists of a head side rail (A) at the left end of FIG. 2, a tail side rail (B) at the right end and a plurality of intermediate rails (C) in the front and rear direction between the rail (A) and the rail (B).

Figure 7:
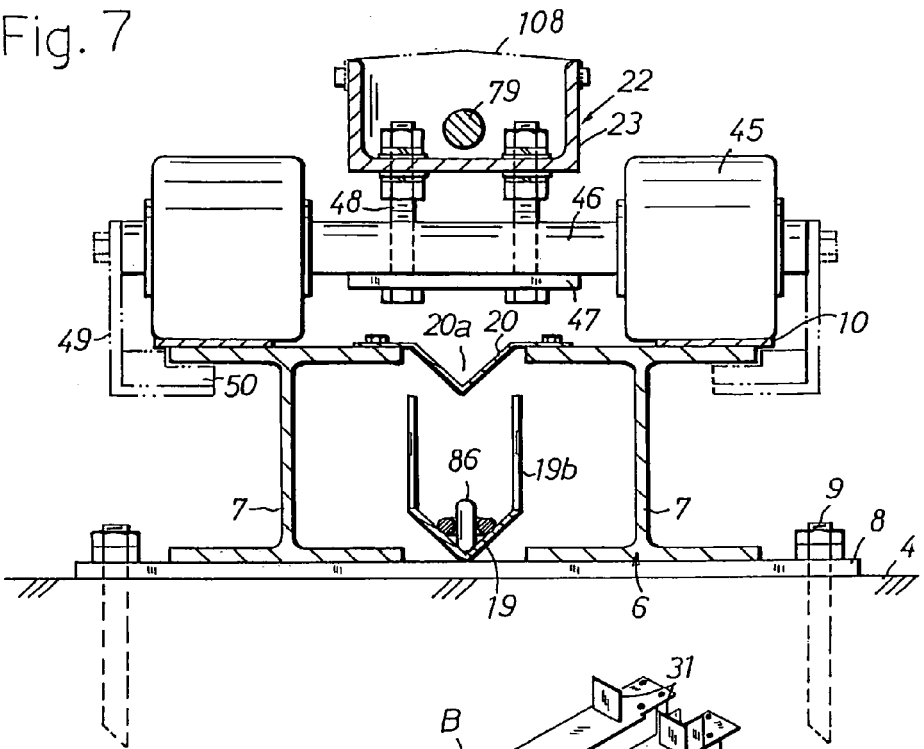
FIG. 7 is a sectional view taken along a line VII—VII in FIG. 2.

The guide rail 6 comprises a pair of rail main bodies 7 formed from H-shaped steels, as fundamentally shown in section in FIG. 7, and spaced apart in the left and right direction so that their grooves are oriented horizontal. These main bodies 7 are fixed by welding to each other through rail connecting plates 8 spaced apart from one another in the longitudinal direction. Anchor bolts 9 attach the left and right ends of the rail connecting plates 8 to the bottom 4 of the basin to lay and fix the rail main bodies 7.

The rail main bodies 7 have the respective upper surfaces constituting their outer sides to which running base plates 10 are fixed by welding. More specifically, the head side rail (A) has its front end portion fixed to the end wall 2 at the front end through a rail bracket 11 and has its rear end portion fixed so that the rail connecting plate 8 comes onto the front end of the bottom 4 of the basin. A third load sheave 12 is fixed widthwise at a forward and lower position on the head side rail (A). Further, a first load sheave 13 is secured widthwise at a higher position slightly rearwards of the third load sheave 12 through a bracket 14 thereon.

The head side rail (A) has a rear side to which a plurality of intermediate rails (C) are continuously connected. Continuously connected to the rear side of the rearmost one of the intermediate rails (C) is the tail side rail (B) through which a second load sheave 15 is fixed. The sheave 15 is secured through a bracket 16.

Figure 8:
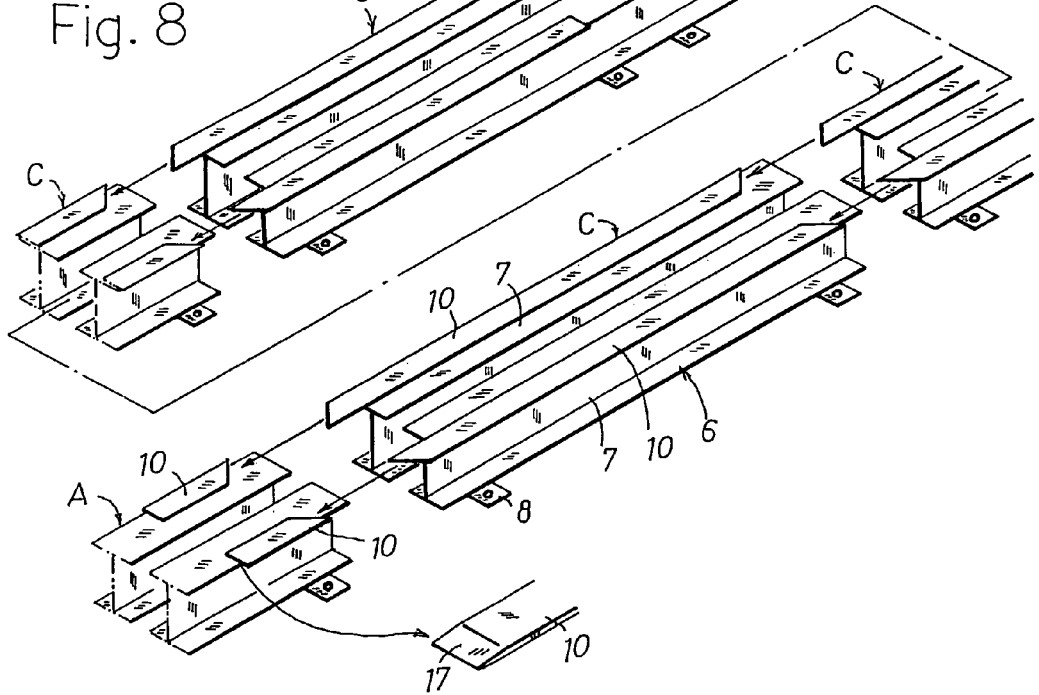
FIG. 8 is a decomposed view showing how to connect guide rails.

Each of the running base plates 10 of the rails (B) and (C) extends forwards from the end, portion of the rail main body slightly to have its leading end cut slant in plan. As for the head side rail (A) shown at a left lower portion of FIG. 8, each of the running base plates 10 has a rear end formed shorter than the rail main body. The long extension of the running base plate 10 of the intermediate rail (C) behind the rear end rides on the rail main body of the head side rail (A) and abuts against the rear end while leaving an extremely small gap therebetween. As regards the intermediate rail (C) composed of plural rails continuously connected to each other, similarly, the running base plate 10 of a rail (C) has a rear end formed shorter. The running base plate 10 of another rail (C) behind the rear end rides on the forward rail main body in continuity therewith. The relationship between the intermediate rails (C) and the tail side rail (B) is the same. Thus one continuous running base plate 10 is formed in pair on the left and right sides on the guide rail 6.

The thus continuously formed running base plate 10 has a front end and a rear end each formed with a gradient 17 so that a running wheel to be mentioned later drops down from the running base plate 10 onto the rail main body when it comes to an advance end or to a retreat end. How the gradient is formed at the front end and the rear end is explained by taking out the relevant portion and enlarging it at a lower column of FIG. 8. This gradient is provided so as to make the sludge scraper first work by producing resistance to the riding-on of the carriage when the carriage takes a return position from a scraping and collecting position and vice versa.

There is fixed within the guide rail 6 an inner rail 19 of an angled member provided with its groove oriented upwards so that it passes over the rail connecting plate 8 as shown in FIG. 7. The inner rail 19 is continuously laid from a position behind the third load sheave 12 in FIG. 2 to a position ahead of the second load sheave 15. Further, the inner rail 19 has a front end and a rear end each of which is provided with a rail piece 19a inclined downwardly. This rail piece 19 enables a pulling and conveying means, which is mentioned later, to be smoothly guided without hanging. In addition, as shown in FIG. 7, the inner rail 19 has either of both horizontal sides provided with a restricting member 19b which prevents the falling of the pulling and conveying means 26 when it circulates downwardly. This restricting member 19b is arranged at a predetermined spacing in a longitudinal direction but it may be formed into a long integral structure.

Moreover, the rail main bodies 7 and 7 define a space having an upper end to which a rail cover 20 is detachably attached so as to prevent the sludge which falls from above, from entering the guide rail 6. The rail cover 20 is provided with a groove 20a widthwise thereof. A carriage to be mentioned later may be provided with a scraper for removing the sludge within this groove 20a. This scraper may be a link chain or the like.

The carriage 22 has a main body 23. The main body 23 comprises a front portion (a) and a rear portion (b). Both of these potions (a) and (b) are channel steels as shown in FIG. 7. They are arranged with their grooves oriented upwards and have their front ends and rear ends connected detachably by flanges 24 as shown in FIG. 2 to form into a slim and sole integral body.

Figure 4:
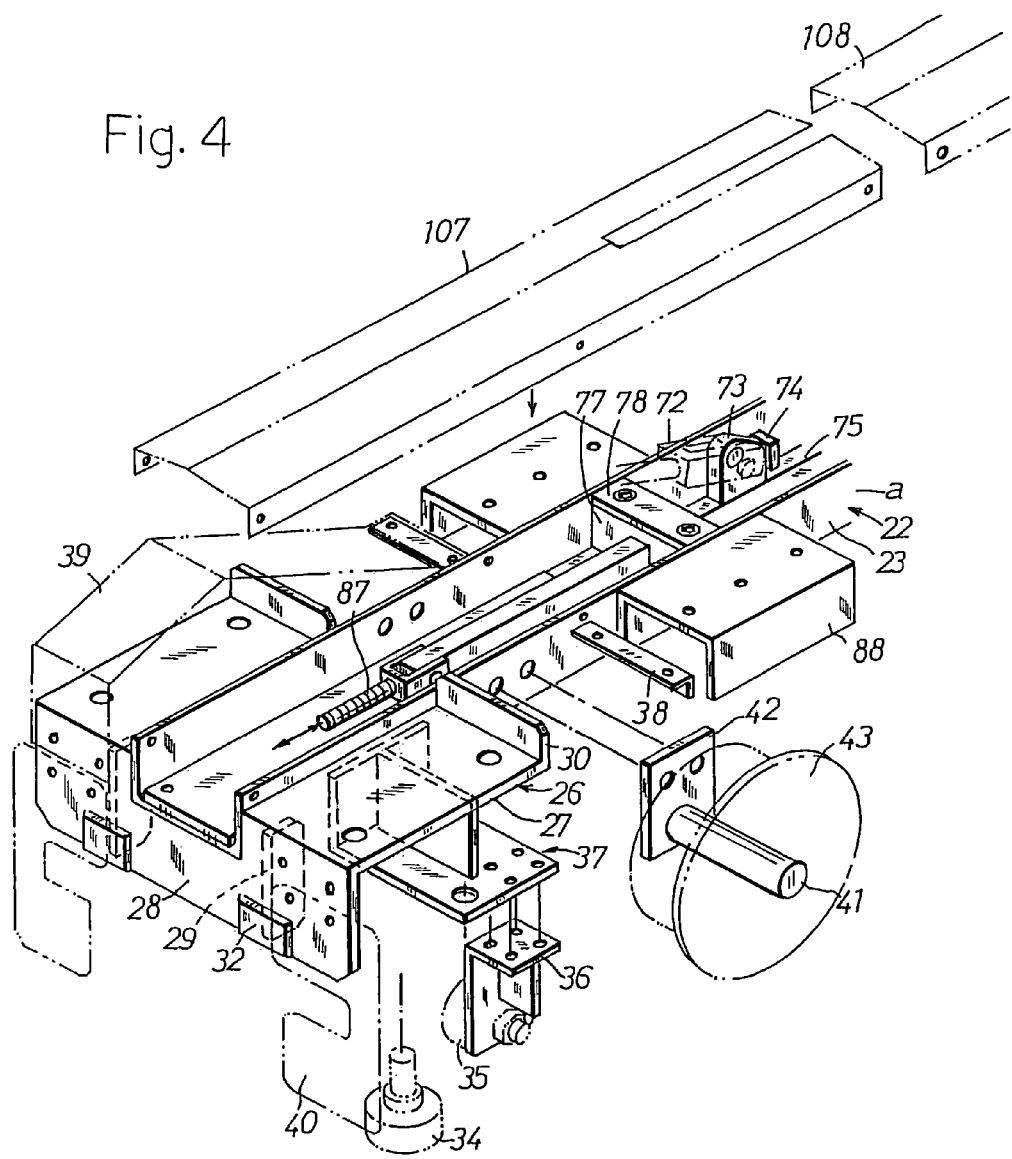
FIG. 4 is a perspective view showing a front structure of the sludge scraping and collecting apparatus.

The carriage main body 23 has the front portion integrally fixed to a receiving board 26 as shown by a perspective view of FIG. 4. This receiving board 26 comprises left and right bearing pedestals 27 each formed in the shape of a horizontal plate and an end plate 28 integrally formed with front ends of the bearing pedestals so that it hangs therefrom at a right angle. They are reinforced by back reinforcing plates 29 and upper reinforcing plates 30. The end plate 28 has a front surface provided with a pair of left and right carriage side butting plates 32 so as to assure safety by butting against a safety stopper 31 (of the type adjustable so as to advance and retreat) arranged on the guide rail 6 as shown in FIG. 2 when the scraping and collecting operation is in emergency.

Figure 3:
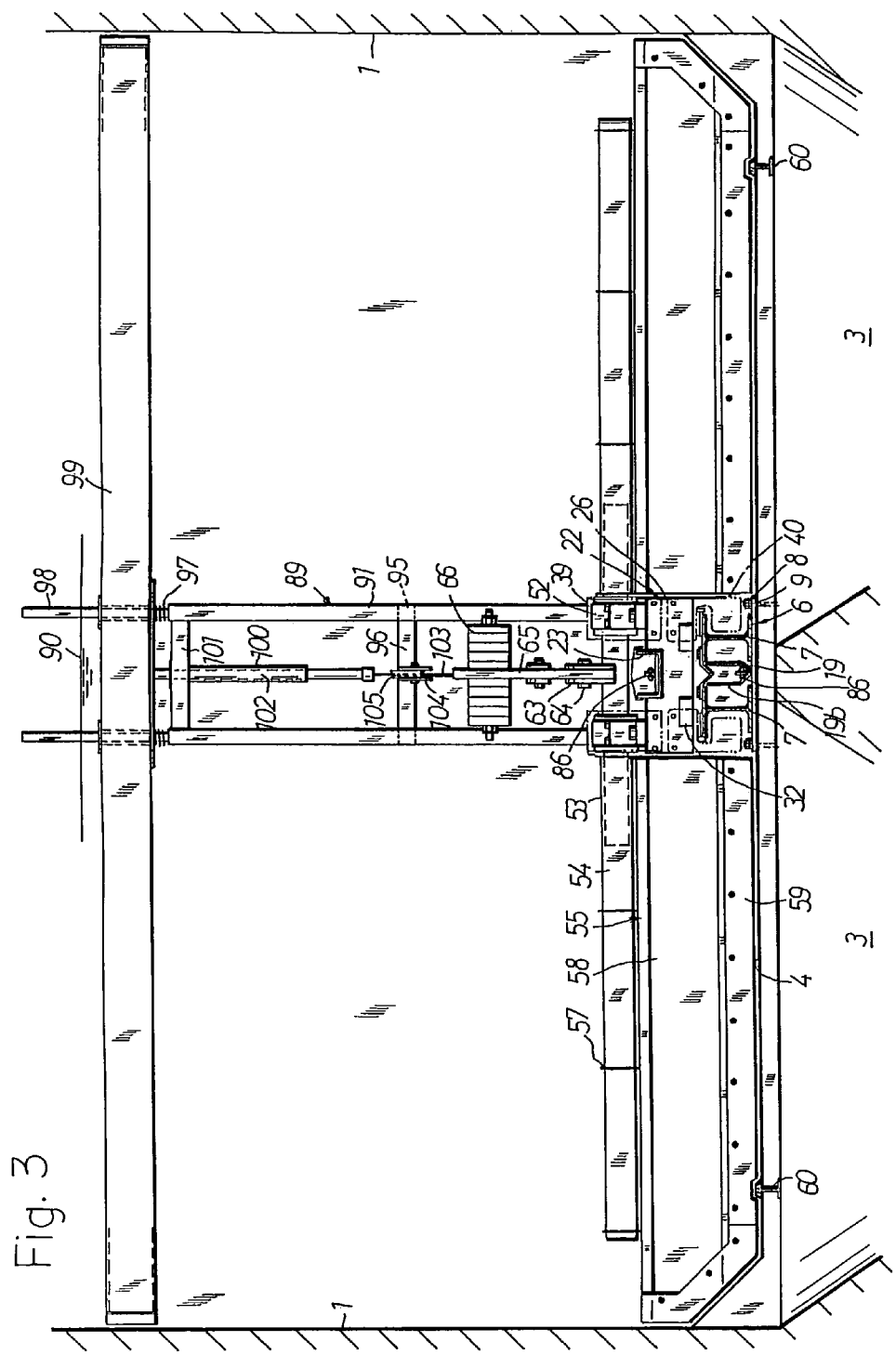
FIG. 3 is a sectional view taken along a line IV—IV in FIG. 2 when seen in a direction indicated by arrows.

The paired left and right receiving boards 26 each has a bottom side to which a roller bracket 37 is integrally fixed. The roller bracket 37 mounts a side roller 34 able to butt against the running base plate 10 from an external and lateral area and a roller 35 (with a bracket 36) for preventing the floating-up, which can butt against an upper web of the rail main body 7 from a lower area, in view of the relationship of position in the front and rear direction. Further, detachably attached between the end plate 28 and a cover receiving member 38 is a side cover 39, which protects the bearing or the like to be mentioned later from the sludge. Additionally, the end plate 28 has a lower and rear surface to which a rail scraper 40 is detachably attached. The rail scraper 40 gets rid of the sludge over the upper surface of the guide rail 6 or within the grooves as shown in FIG. 3.

These constructions are substantially the same as those at the rear end portion of the carriage, so that they are only designated by the same reference numerals and an explanation therefor is omitted.

Shaft attaching plates 42 with shafts 41 integrally projecting therefrom are mounted rearwards of the receiving board 26 of the carriage main body 23 so that they can be fixed by bolts from lateral sides. Running wheels 43 are rotatably fitted around the pair of left and right shafts 41. The running wheels 43 roll over the running base plates 10.

A pair of left and right intermediate auxiliary wheels 45 are equipped in the vicinity of the front and rear joint portions of the carriage main body 23 as non limitative resin wheels.

On the other hand, a pair of left and right bearings 52 are detachably fixed onto the respective bearing pedestals 27 of the front and rear receiving boards 26 so that their axes are oriented widthwise. A rotary solid (or pipe) shaft 53 is provided so that it passes through these bearings 52 and projects from both sides. This rotary shaft 53 has opposite ends provided with a pair of left and right sludge scrapers 55. Each of the sludge scrapers 55 comprises a scraper pipe 54, a scraper main body 58 and a scraper rubber strip 59. The scraper pipes 54 are inserted onto opposite ends of the rotary shaft 53 and are detachably fixed through attaching members 56. The scraper main body 58 is fixed to the scraper pipe 54 by a connection band 57 which projects from the scraper pipe 54. The scraper rubber strip 59 is provided so as to extend over a lower edge and an outer edge portion of the scraper main body 58. Further, each of the front and rear scraper main bodies 58 has a rear and lower portion provided with a gage wheel 61 so that it is rollable over a laid guide rail 60 and is adjustable in height.

Figure 5:
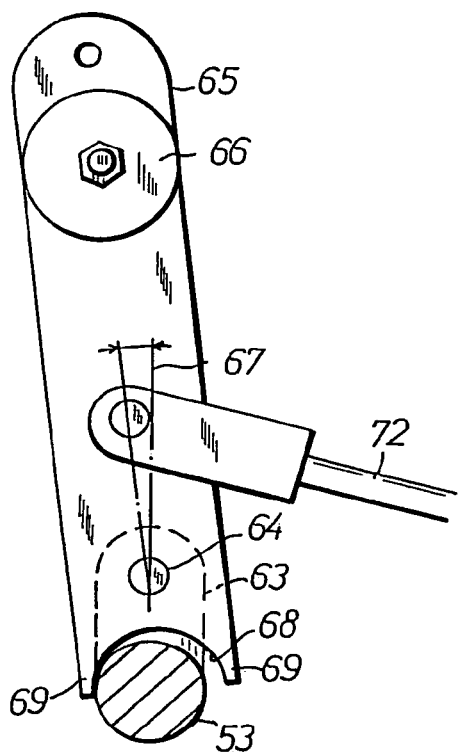
FIG. 5 is a vertical sectional view showing a weight swing mechanism switched over to a forward position.
Figure 6:
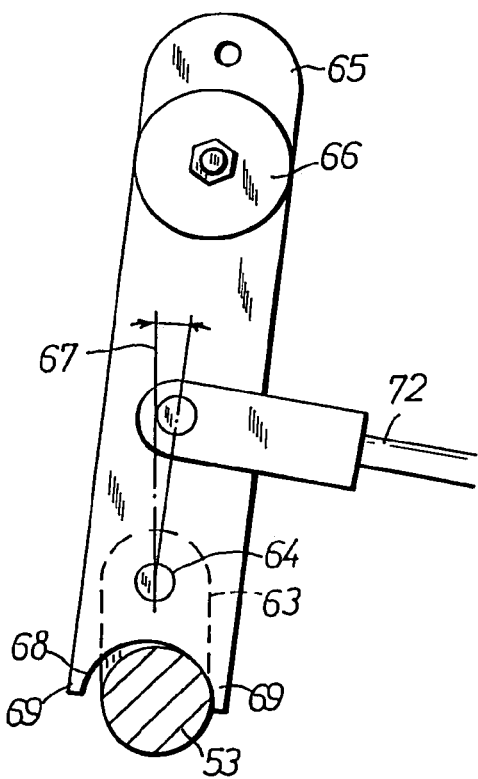
FIG. 6 is a vertical sectional view of the weight swing mechanism switched over to a rearward position.

Meanwhile, a pair of left and right short receiving arms 63 are provided at a position between the bearings 52 of the front rotary shaft 53 as shown in FIGS. 5 and 6 so that they project from the rotary shaft 53 and rotate together therewith. A front interlockingly moving arm 65 which extends vertically high through a bending fulcrum axis 64 is pivoted swingably in the front and rear direction between the arms 63. This arm 65 has an upper portion provided with an adjustable weight 66. The arm 65 has a lower end portion formed in the shape of a semi-circular notch 68 having an inner diameter larger than a diameter of the rotary shaft 53, so that the weight 66 can swing in the front and rear direction with reference to a vertical line 67. The notch 68 has a front lower end portion 69 and a rear lower end portion 69 which alternatively abuts against the rotary shaft 53.

Thus when the weight 66 swings forwardly of the vertical line 67 as shown in FIG. 5, it enables biasing force to act rotatably and forwardly to thereby stabilize the scraper 55 at the scraping and collecting position. On the other hand, when the weight 66 swings rearwardly of the vertical line 67 as shown in FIG. 6, it enables the biasing force to act rotatably and rearwardly to thereby stabilize the scraper 55 at the lifted-up position (return position). A rear interlockingly moving arm 71 is substantially V-shaped. It does not have such a swing mechanism as the front interlockingly moving arm 65 and therefore is fixed to the rotary shaft 53 so that it stands up vertically therefrom.

An interlockingly moving link 72 is adapted to have its length adjustable and has one end connected to each of the front interlockingly moving arm 65 and the rear interlockingly moving arm 71. The interlockingly moving link 72 has the other end a lower portion of which is connected to an advancing and retreating piece 73 which advances and retreats horizontally in the front and rear direction. The advancing and retreating piece 73 is provided with a butting member 74 and is arranged at a front position and a rear position. Each of them is integrally fixed onto an advancing and retreating slider 75 in the shape of a square bar which advances and retreats over a bottom of a widthwise mid portion within the carriage main body 23 as shown in FIG. 4. The advancing and retreating slider 75 is arranged in pair at the front position and at the rear position. Each of them is guided within a square bore of a resin slider receiver 77 provided in the carriage main body 23 so that it can advance and retreat. The slider receiver 77 is detachably attached by an upper press plate 78. A relay link 79 formed from a round rod is connected between the front and rear sliders 75 as shown in FIG. 1.

Numeral 80 designates a front stopper and numeral 81 indicates a rear stopper. They are provided at front and rear two positions of the carriage main body 23 through brackets 82 so that they are adjustable in the front and rear direction. The butting members 74 abut against the stopper 80 and the stopper 81 so as to regulate the scraper to the scraping and collecting position and to the return lifted-up position, respectively.

As shown in FIG. 2, a driven wheel 85 of a load sheave for a link chain is provided above a widthwise mid portion of the basin. The driven wheel 85 is controlled for normal rotation or reverse rotation by a driving source of a motor with reduction gears. It is rotated normally or reversely by a limit switch not shown. A pulling and conveying means 86 is a link chain wrapped around the driven wheel 85 and is connected to a link anchor 87 shown in FIG. 4 via the first load sheave 13. The pulling and conveying means 86 has the other end connected to a rear link anchor and enters into the guide rail 6 through the second load sheave 15 as shown in FIG. 2. It moves forwards while being guided by the inner rail 19 and is wrapped around the first driven wheel 85 via the third load sheave 12.

The carriage main body 23 has front opposite sides to which support column pedestals 88 are fixed as shown in FIG. 4. A support column 89 as shown in FIG. 3 stands on the pedestals 88. The support column 89 constitutes a scum scraping and collecting device. The scum scraping and collecting device scrapes and collects scum floating on water surface 90 to a scum removing device to be mentioned later. The support column 89 comprises four column members of two higher front ones 91 and two lower rear ones 92. These column members stand on a support column mounting base 93 at their lower ends, which is detachably fixed onto the column pedestal 88 as shown in FIG. 4. A longitudinal connecting member 95 connects an upper end of the rear column member 92 to the front column member 91. A lower connecting member 96 spans between the left and right connecting members 95.

Further, there stand on an upper end of the support column 89 a pair of left and right vertically guiding bars 98 each of which has a coil spring 97. A scum scraping and collecting plate 99 is adapted to vertically move with respect to the bar 98. The scum scraping and collecting plate 99 comprises a hollow member, rectangular in section, and has an interior area filled with a foam material so as to secure buoyancy. The scum scraping and collecting plate 99 has a widthwise mid portion from the bottom of which a pull-down bar 100 projects. This bar 100 is vertically guided by a bar guide pipe 102 which hangs down from an upper horizontal connecting member 101. The bar 100 has a lower end to which one end of a float and sink connecting wire 103 is connected. The wire 103 is connected to an upper end of the front interlockingly moving arm 65 via a sheave 105 provided in a bracket 104 which projects from a front surface of the lower horizontal connecting member 96.

Next, an explanation is given for the operation of the sludge scraping and collecting apparatus.

FIGS. 1, 2 and 3 show a state just before the scraping and collecting operation is finished. In this state, as shown in FIG. 2, the pulling and conveying means 86 is pulled as shown by a solid line arrow (F) to result in pulling the advancing and retreating slider 75 connected to the means 86 as shown in FIG. 4. Then it pulls the advancing and retreating piece 73 on the slider 75 forwardly in FIG. 4 and pushes out the front interlockingly moving arm 65 forwards through the interlockingly moving link 72 connected thereto. The front interlockingly moving arm 65 becomes apt to lean forwardly to be biased forwards as shown in FIG. 5 and retains the sludge scraper 55 upright by the receiving arm 63 through the bending fulcrum axis 64 so as to take the scraping and collecting position. On the other hand, in the rearward area, when the advancing and retreating slider 75 as shown in FIG. 4 is pulled forward, the advancing and retreating piece 73 is pulled forwardly through the relay link 79 (see FIG. 1) connected thereto and then stops with the butting member 74 abutting against the rear stopper 81. When the advancing and retreating piece 73 is pulled forwards, the rear interlockingly moving arm 71 stands upright as shown at the middle stage of FIG. 2 through the interlockingly moving link 72 and at the same time the rear scraper 55 is regulated to a vertical scraping and collecting position as well. The rear scraper 55 has advanced by a stroke (S) while taking the scraping and collecting position up to now as shown in FIG. 2.

Owing to the fact that the front interlockingly moving arm 65 leans forwards at the time of scraping and collecting, the float and sink wire 103 as shown in FIG. 2 is pulled forwardly. Along with this forward pulling, the pull-down bar 100 as shown in FIG. 3 is pulled down through the sheave 105 by compressing the coil spring 97. The scum scraping and collecting plate 99 at the upper portion is pulled down below the water surface 90 and return in a direction corresponding to the direction (F) without scraping and collecting back the scum.

Thereafter, the limit switch acts on the driving source to switch over the pulling and conveying means 86 to a reverse rotation (rightward rotation in FIG. 2). The carriage butting plates 32 are adapted to abut against the front safety stopper 31. But this operates in emergency. Normally, the above-mentioned switch functions to stop the advancement of the carriage 22. Due to the reverse rotation, as shown in FIG. 2, the pulling and conveying means 86 is pulled in a direction indicated by a broken line arrow (R) and pulled forward via the third load sheave 12 by being guided along the inner rail 19 within the guide rail 6. And the pulling and conveying chain 86 which has come to circulate upwards via the rear second load sheave 15 is pulled rearwards. Thus the rear advancing and retreating slider 75 acts in the same direction and at the same time the front advancing and retreating piece 73 is pulled rearwards through not only the rear advancing and retreating piece 73 but also the relay link 79. As a result, the front and rear interlockingly moving links 72 move rearwards together to make the front and rear interlockingly moving arms 65 and 71 connected thereto lean rearwards. Thus the front interlockingly moving arm 65 interlockingly moves the rotary shaft 53 through the receiving arm 63 as shown in FIG. 2 after the weight 66 has swung rearwards, to lift up the sludge scraper 55, thereby enabling it to take the return position. The rear interlockingly moving arm 71 also leans rearwards through the interlockingly moving link 72. In correspondence thereto, the rear sludge scraper 55 rises up forward to take the return position. These operations have the front advancing and retreating piece 73 abutted against the front stopper 80 as shown at the middle stage of FIG. 2 to stop and lock the whole interlockingly moving mechanism to the return position. However, it cannot be said that the carriage 22 does not commence the retreating movement earlier by a rearwardly acting force prior to this stopping and locking operation, Accordingly, the front end of the running base plate 10 is arranged to slightly drop down the front running wheels 43 therefrom a little before the scraping and collecting operation finishes. To the contrary, the front end of the running base plate 10 is adapted to have resistance which the front running wheels must overcome when retreating. Therefore, the rearwardly acting force produced by the pulling and conveying means 86 does not first act to retreat the carriage 22 but makes the interlockingly moving arms 65 and 71 act first. This is in an attempt to ensure such a movement that first the sludge scraper 55 is switched over and then the carriage 22 starts moving. This is the same to the case where the return position is switched over to the scraping and collecting position.

Moreover, as for the scum scraping and collecting plate 99, the front interlockingly moving arm 65 leans rearwards to loosen the wire 103, thereby allowing it to float up to the water surface along with the repulsion of the spring 97 and to take the scum scraping and collecting position. Consequently, after the front running wheels 43 have ridden unto the running base plate 10, the above actions continuously drive the pulling and conveying means 86 to return the front and rear sludge scrapers 55 in the direction (R) in FIG. 2 while being lifted up. And at the same time, the scum scraping and collecting plate 99 scrapes and collects the scum on the water surface to the scum removing device. When the sludge scraping and collecting apparatus returns to the rear end, the limit switch acts, thereby enabling the driving source to switch over the rotation to the reverse one (leftward rotation in FIG. 2). This switches over the front and rear scrapers 55 to the vertical scraping and collecting position (see the lower stage in FIG. 2). In this state, the front scraper 55 comes to a waiting position a little behind the rear sludge scraper 55 shown at the middle stage. Meanwhile, if the rear sludge scraper 55 at the lower stage in FIG. 2 advances by a stroke (S), it comes to the position illustrated by a solid line at the middle stage. More specifically, the sludge in the rear region is brought into the pit 3 by two-step scraping and collecting operation. On the contrary, the scraping and collecting apparatus advances and retreats by about a half stroke. Owing to this fact, as shown by an imaginary line in FIG. 1, a third scraper may be arranged between the front and rear sludge scrapers 55. Further, at least four scrapers may be arranged. These scrapers are all in an interlockingly moving relationship with each other. Further, after the sludge scraping and collecting apparatus has retreated and then has been switched over to the scraping and collecting position, the scum scraping and collecting plate 99 is pulled down and sunk below the water surface so as not to scrape and collect back the scum in the left direction in FIG. 2 and returns in the direction (F).

The above-mentioned embodiment utilizes a link chain as the pulling and conveying means. It may be a timing belt, a wire or the like ropes.

Figure 9:
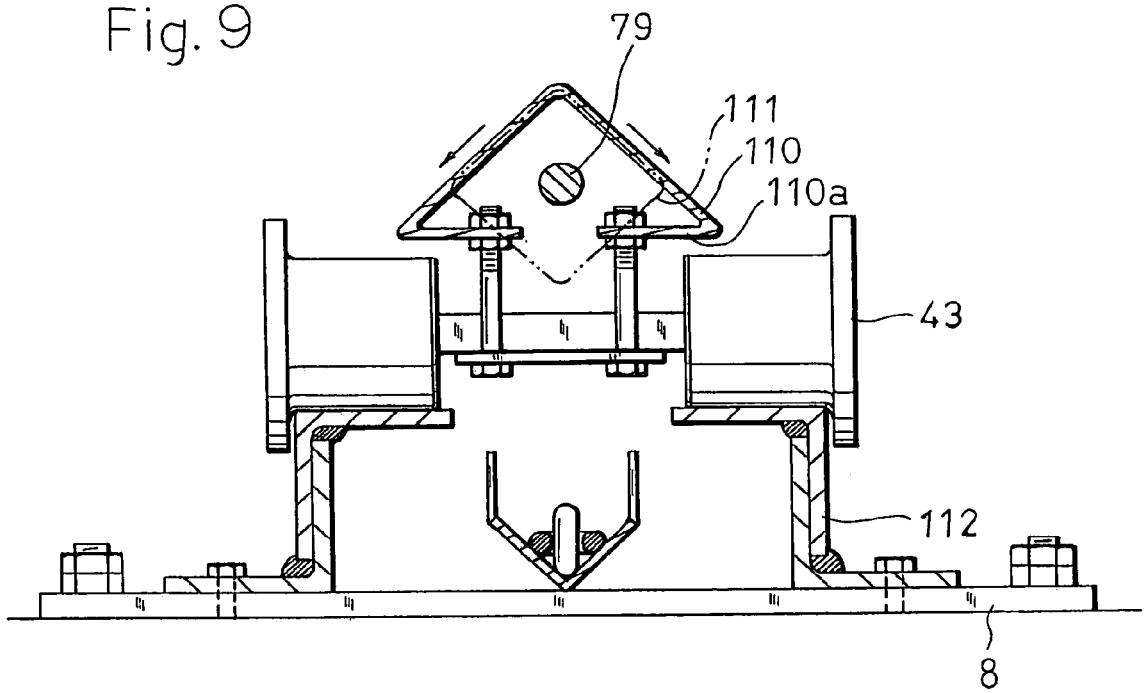
FIG. 9 is a vertical sectional view showing an embodiment of a carriage main body in the shape of a mountain.

The carriage main body may have the grooves arranged downward and may employ semi-round pipes. Especially, in order that depositing sludge does not stay although the carriage main body has a simplified structure, it may be formed as a carriage main body 110 in the shape of a mountain or an angle as shown in FIG. 9. The main body 110 has a bottom side portion 110a and may be integrally press-formed. The carriage main body may be formed as a carriage main body 111 made of a rectangular pipe having at least one angular ridge oriented upward as shown by an imaginary line in FIG. 9. As shown at the same time in the same Figure, a guide rail 112 may be formed from a pair of left and right main bodies each of which comprises two angled members integrally formed by welding into an intermingled structure.

In the foregoing embodiment, an explanation was given for the sludge scraping and collecting apparatus with the scum scraping and collecting device. There is a case where the sludge scraping and collecting apparatus is constructed as only a sludge scraping and collecting apparatus without the scum scraping and collecting device.

The carriage main body 23 is opened at its upper portion as shown in FIG. 4, so that a front upper closure 107 and a rear upper closure not shown may be detachably attached.

As for the sludge scraper 55, two ones are arranged at the front and rear positions. However, it may be three ones and further more ones like four ones, five ones, six ones and so on.

Figure 10:
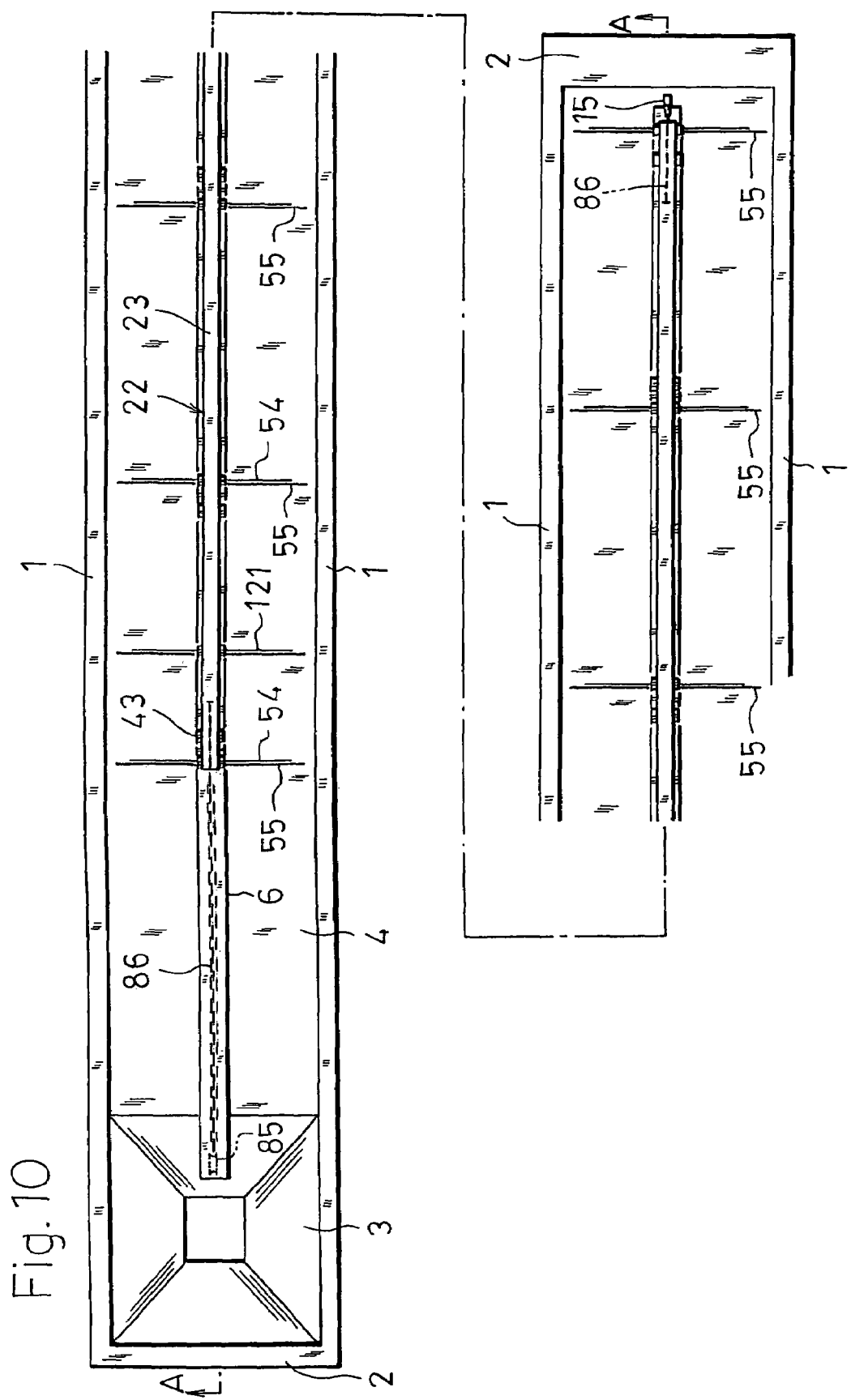
FIG. 10 is a plan view of a sedimentation basin equipped with a sludge scraping and collecting apparatus showing another embodiment.
Figure 11:
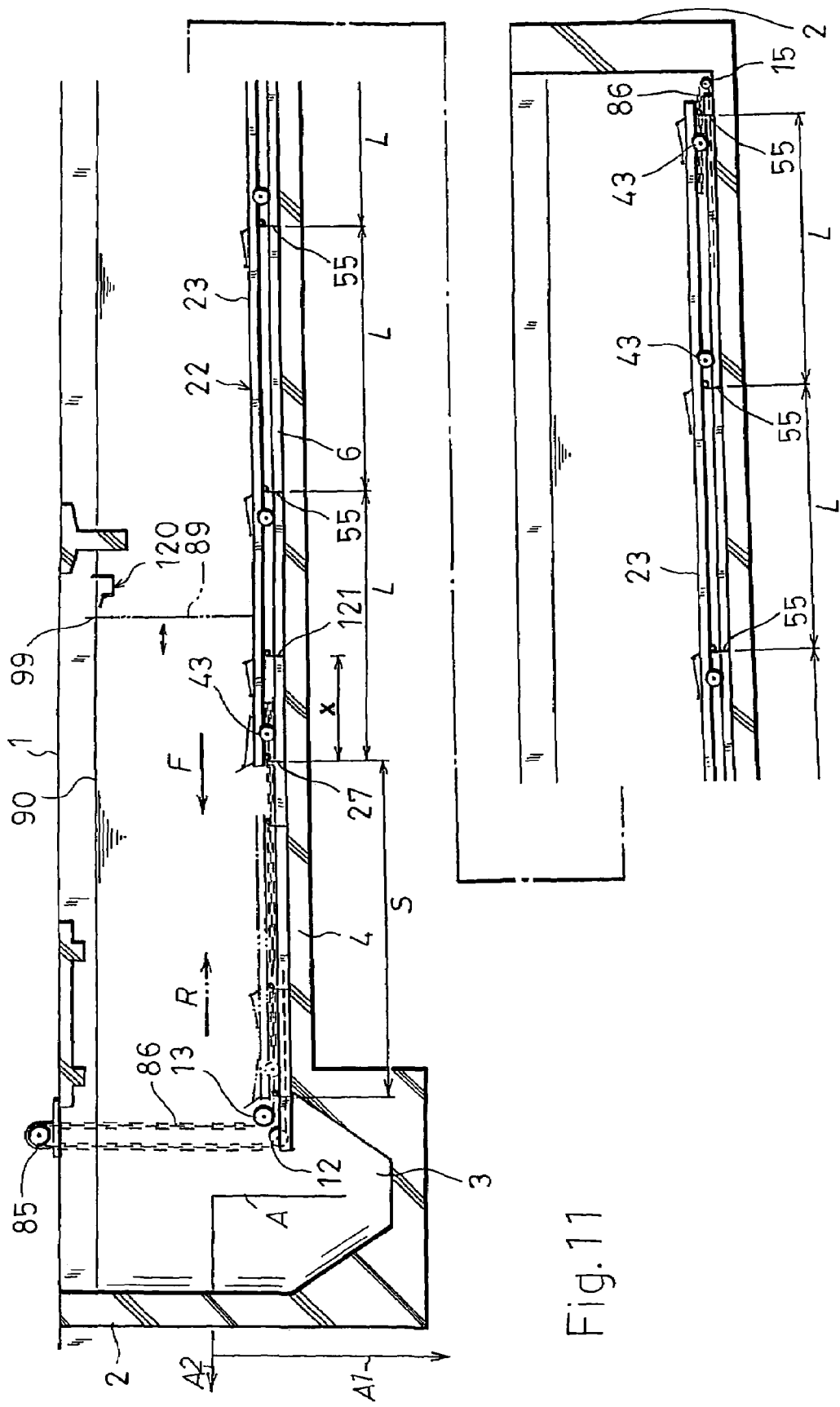
FIG. 11 is a sectional view taken along a line A—A in FIG. 1.

FIGS. 10 and 11 show another embodiment where six sludge scrapers are arranged. Character (L) designates a pitch between sludge scrapers and character (S) indicates an advancing and retreating stroke. The (S) is set to be longer than the (L). A scum removing device 120 is provided at a position on the water surface and rightwardly separated from the scum scraping and collecting plate 99 in the upper stage view of FIG. 11. The scum removing device 120 is provided with a weir which periodically floats and sinks, in front of a fixed angular trough spanning between the side walls 1. The weir sinks below the water surface 90 to thereby swallow the scraped and collected scum. The scum removing device may be of pipe skimmer system or the like.

In FIG. 2, the sludge scraper 55 is relatively high such that its height ranges between about 500 mm to 600 mm. However, its height may be reduced to 150 mm to 400 mm. Particularly, the scraping and collecting apparatus of FIG. 11 with the final sedimentation basin taken as an intended object has the scraper 55 the height of which ranges from 150 mm to 300 mm. This effectively prevents the hoisting of the sludge which floats along with the advancement and retreat. The scraper 55 preferably has a height about 200 mm and advances and retreats at a speed set to about 0.27 m/min., which is about 10% lower than the standard speed (about 0.3 m/min.) of the conventional flight. Then the sludge of floatability is not scraped and collected up.

In the case where the advancing speed of the sludge scraper is set to a lower one, it will be considered that the scraping and collecting amount may be reduced. Thus the present invention may arrange at least one auxiliary scraper 121 vertically movably other than the original sludge scrapers 55 spaced apart at a predetermined interval in the front and rear direction, on a front side where more sludge deposits from the flow-straightening plate, namely, when seen from the front end, between the first and second sludge scrapers 55 so as to secure the scraping and collecting amount. The presence of the auxiliary scraper 121 assures the scraping and collecting amount and also the stroke (S) is set so as to correspond to within a time span for maintaining the active state. The active fungus in the returned sludge is sent to aeration as it is alive and is used effectively for purification.

Figure 12:
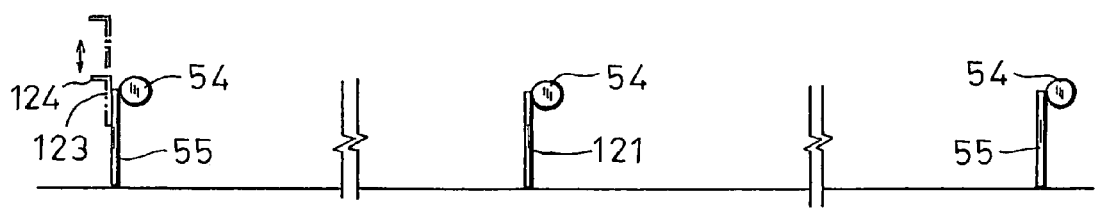
FIG. 12 is a side explanatory view showing another embodiment.

FIG. 12 shows a plate 123 added to the sludge scraper 55 at the front end so as to adjust the height of the latter. There is a case where the sludge scraper is required to scrape and collect more sludge depending on the sedimentation basin. The plate 123 is to make it possible to access this case. The plate 123 has an upper end provided with a long forward projection 124 widthwise, which prevents the hoisting.

Figure 13:
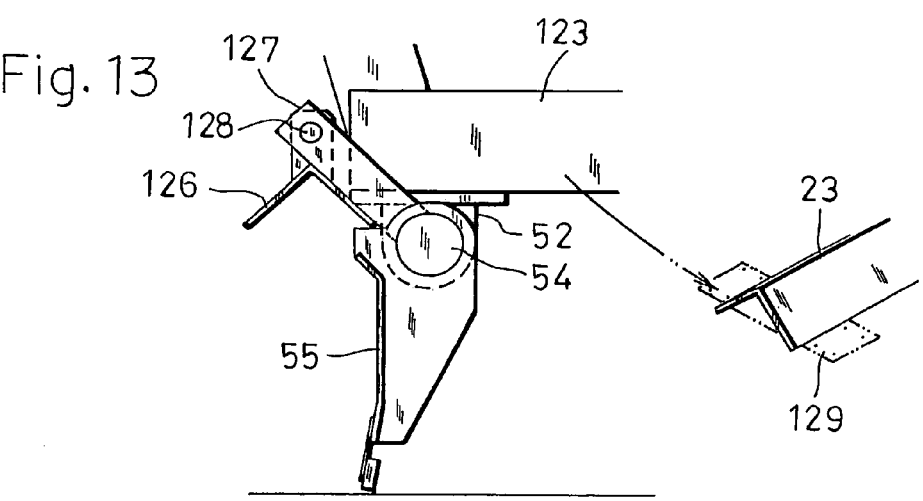
FIG. 13 is a side view showing still another embodiment.

FIG. 13 shows another embodiment which further provides in front of the scraper pipe 54 a plate 126 made of an angled member or the like to prevent the hoisting. The plate 126 is attached to a stay 127 standing obliquely and forwardly from the scraper pipe 54. It may be moved around an axis 128 so as to be able to adjust its angle and height. Further, the plate 126 may employ a semi-round pipe. The carriage main body 23 may be formed in the shape of a roof as shown by a right view through using an angled member so as to serve as not only a framework but also a cover over which the sludge flows down leftwardly and rightwardly. Numeral 129 indicates a bracket for a bearing.

Figure 14:
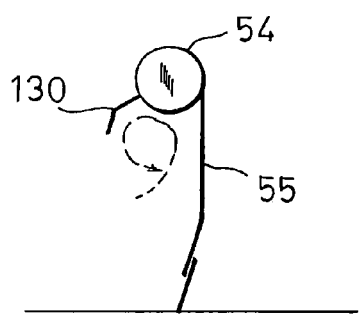
FIG. 14 is a side schematic view showing still another embodiment.

FIG. 14 shows still another embodiment which prevents the hoisting of the sludge. The sludge scraper 55 is arranged so that it deflects rearwards of the scraper pipe 54, thereby forming a forward area. The presence of this forward area makes the hoisted portion of the sludge reversely rotate as indicated by an arrow to damp and disappear. Further, the scraper pipe 54 may have a peripheral front side provided with a reversely rotating guide plate 130 so as to project therefrom.

Figure 15:
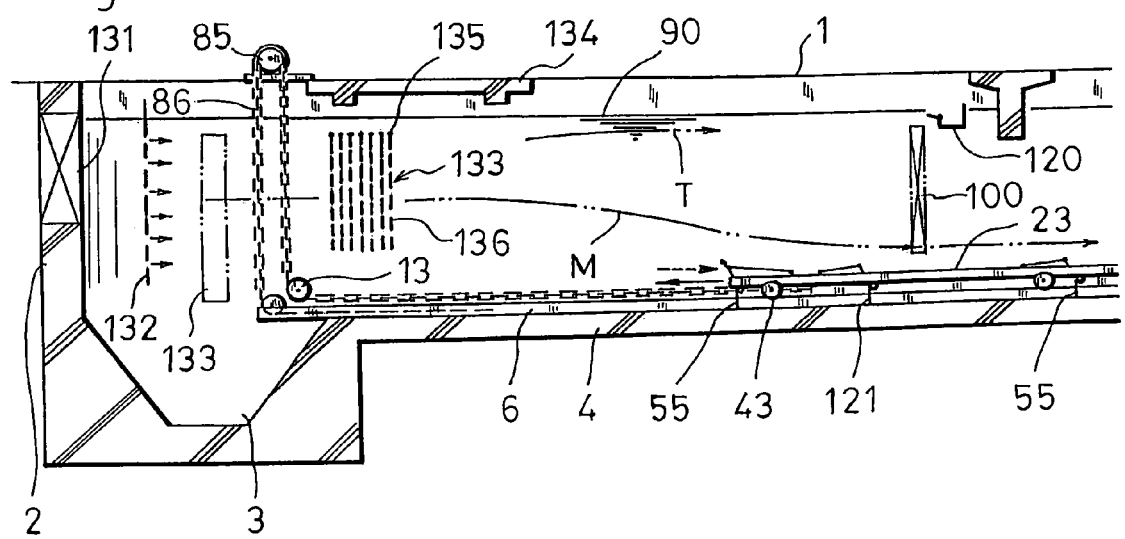
FIG. 15 is a vertical sectional view showing an embodiment of a device for inhibiting density current.

FIG. 15 shows still another embodiment. In FIG. 15, the sedimentation basin is taken as the final one. The sedimentation basin has left and right side walls 1 as well as front and rear end walls 2 upstream one of which is shown. It has the pit 3 at an upstream end of the bottom wall 4. The upstream end wall 2 is provided with a flow-in control wall 131 having a number of flow holes. Mixture liquid from a flow-in water channel is introduced into the basin through the flow-in holes. Numeral 132 indicates a flow-straightening plate which has a number of holes and is opposed to the control wall 131 so as to further straighten the flow of the mixture liquid. There is a case where the flow-straightening plate 132 is not provided.

In such a final sedimentation basin, when it rains a lot and the amount of the flow-in water reaches the peak, contrary to a short-circuit current which flows in an upper layer as indicated by an arrow (T), the mixture liquid which has become low in temperature and slightly large in density due to rain fall does not straightly flow down but is changed to inertia current as density current. While it tends to moderately flow down as shown by an arrow (M) in FIG. 15, it is induced into a downstream direction and then is reversed upwardly ahead of the downstream end wall many times. If such a density current occurs, it has caused an unfavorable problem that not only the depositing efficiency decreases during the occurrence of the density current but also it flows to the flow-out area of the basin along with the sludge flocs of floatability while being accompanied thereby and is reversed to become floating-up current, thereby allowing these flocs to flow out through the upper overflow weir.

In view of the above fact, this embodiment effectively suppresses the density current (M) by a simple system to thereby inhibit the flow-out phenomenon of the sludge flocs and realizes the early recovery of the active sludge through accelerating the deposit of the sludge at the beginning of the flow-in or the like. Further, it suppresses the occurrence itself of the sludge flocs in an attempt to prevent the foregoing problems from appearing.

More specifically, this embodiment arranges a flow-inhibiting means 133 slightly behind a front end of the guide rail 6 in the basin as shown in FIG. 15 and just after a position where the link chain 86 vertically runs, over the entire width of the basin so that they suspend. The flow-inhibiting means 133 comprises plural support bars 135 provided horizontally widthwise at a position just below the water surface 90 and at a portion where they are hidden just below an upper wall 134 and spaced apart at a predetermined distance in the front and rear direction, and inhibiting members 136 composed of linked members such as various kinds of ropes (including a string and a wire rope), a thin rod, a chain (including a link chain), strip members such as rubber strip and the like spaced apart at a predetermined distance longitudinally of the support bars 135 so that they suspend from the support bars 135. These various kinds of ropes and thin rods are similarly applicable in the other embodiments. These inhibiting members 136 are arranged in staggered fashion when seen in plan. The flow-inhibiting means 133 may be arranged upstream of the area where the link chain 86 is running longitudinally (see the position indicated by a two-dot chain line).

Further, a cylinder of a long stroke and a hydraulically driven system may be arranged in parallel with a long carriage main body and thereon. Its rod is connected to a leading end of the guide rail and may be advanced and retreated by alternatively introducing water under pressure into a front portion and a rear portion of a piston within the cylinder. The carriage main body itself may be the cylinder.

Figure 16:
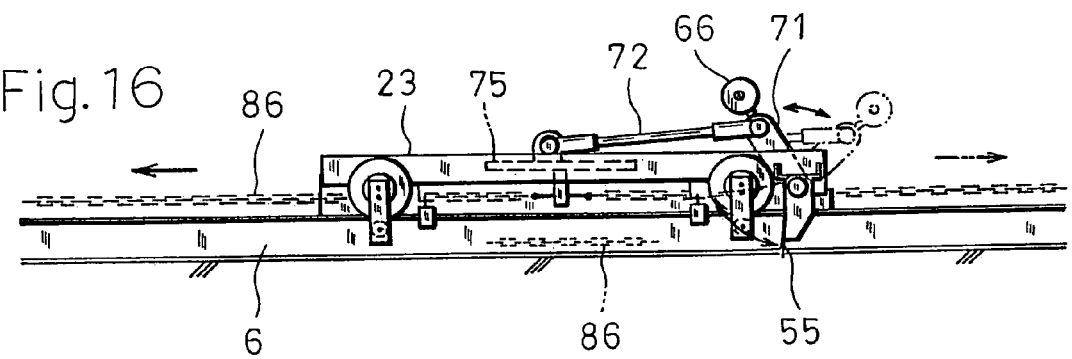
FIG. 16 is a side view of a sludge scrape and scraping and collecting view showing another embodiment.

FIG. 16 shows still another embodiment concerning a compact sludge scraping and collecting apparatus wherein the carriage main body 23 is short in the front and rear direction and is equipped at its rear portion with the sludge scraper 55. The carriage main body 23 is formed from a thin sole body in the above-mentioned shape of a mountain in section and has running wheels 43, side rollers 34, float-up preventing rollers 35 arranged as well as the long-type one. As for the other parts, numerals 86, 75, 72, 71 and 66 designate a pulling and conveying means, an advancing and retreating slider, an interlockingly moving link, a rear interlockingly moving arm and a weight, respectively. The sludge scraper 55 may be provided on the front side in some cases.

FIGS. 17 and 18 show another embodiment of a sludge scraping and collecting apparatus for a circular sedimentation basin. The circular sedimentation basin comprises a conical bottom wall 141 which has a mid portion provided with a pit 140 and has a peripheral wall 142. It further includes a V-notched overflow weir 143 arranged along the peripheral wall 142 and a baffle plate 144 on an inner peripheral side of the weir 143. A sewage introduction pipe 145 spans horizontally over the sedimentation basin. The sewage introduction pipe 145 has a mid portion communicated with a vertical pipe 146 through which the sewage falls down. The vertical pipe 146 has an outer periphery provided with a center well 148 fixed through a stay 147. Numeral 149 indicates a sewage diffusion board.

The pit 140 has an upper opening to which a support 151 in the shape of a cross when seen in plan is secured. The support 151 has a mid portion provided with a vertical fixed pipe 152. The pipe 152 is provided with a vertical shaft 153 rotatably. This vertical shaft 153 has a lower end to which a rotary blade 155 is attached so as to feed the sludge which flows into the pit 140 to a sludge discharge passage 154 communicated with a peripheral portion of the pit 140. On the other hand, a pair of rake arms 156 are rotatably attached around the vertical shaft 153. Each of the rake arms 156 is provided with a number of rakes 157 and has a leading end equipped with a driving source 158 which consists of an underwater motor and a reduction gear. One of the rake arms 156 has a leading end provided with a driven wheel 159 of rubber tire type so that it is compulsorily driven by the driving source 158 and rotates while rolling on the bottom wall 141. The other rake arm 156 may be also provided with the driven wheel 159. In this case, the driven wheel is alternatively of free rotation type and of compulsory rotation type.

A distribution cord 160 of the driving source 159 is led to an upper rotary conductive joint 162 through a central pipe 161 so as to make it energizable.

Figure 19:
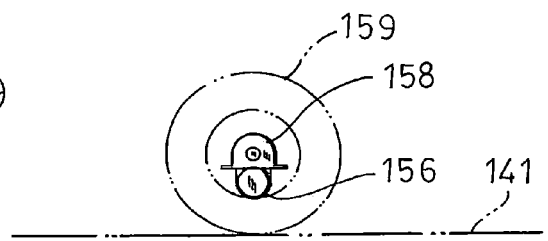
FIG. 19 is a front view showing a relationship between a rake arm and a driving source and a driving wheel.
Figure 20:
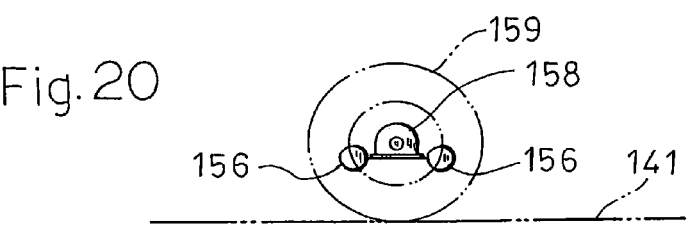
FIG. 20 is a front view showing another embodiment.
Figure 22:
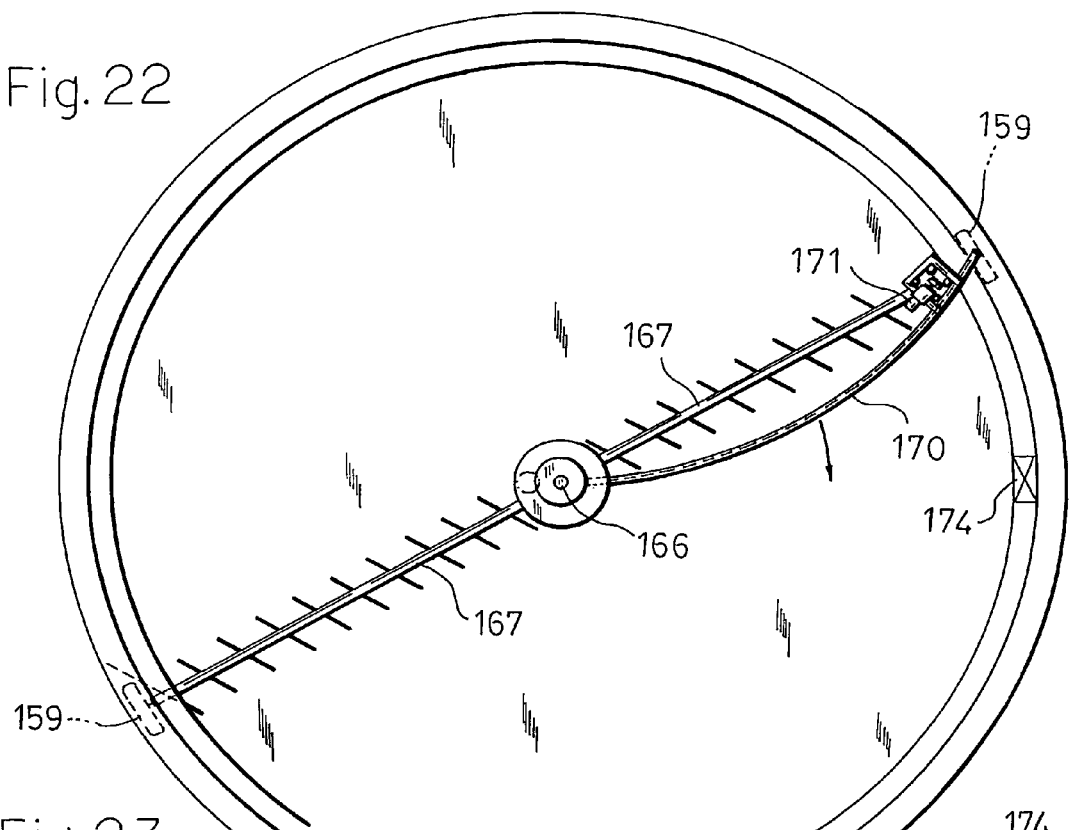
FIG. 22 is a plan view showing another embodiment of the sludge scraping and collecting apparatus for the circular sedimentation basin.
Figure 23:
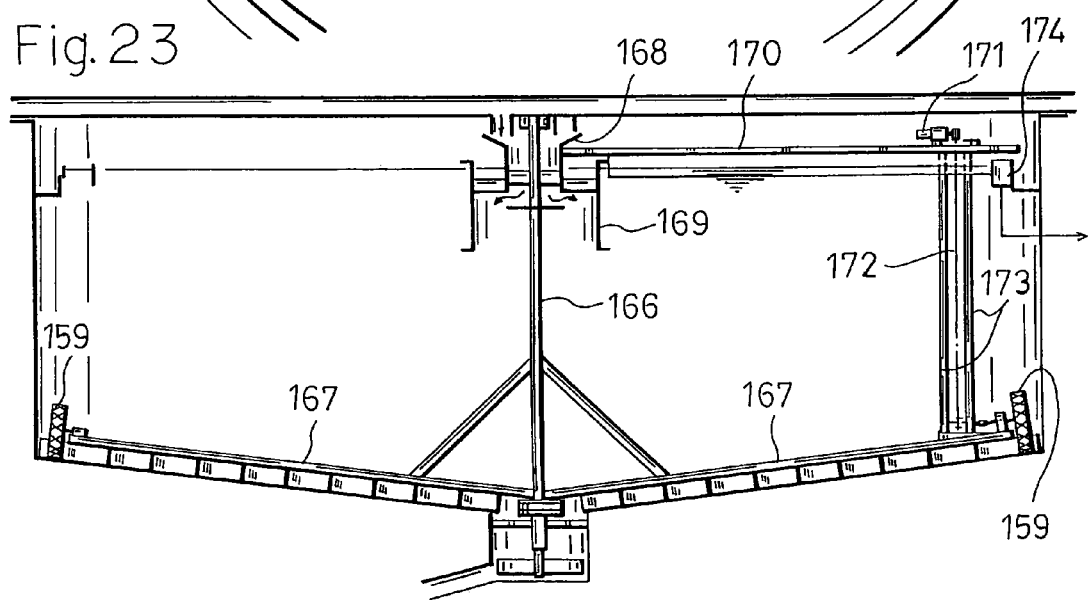
FIG. 23 is a vertical sectional view of FIG. 22.

The rake arm 156 is composed of a single pipe as shown in FIG. 19. However, there is a case where it is composed of at least two pipes as shown in FIG. 20. In the event that the sedimentation basin is so large that it has an opening the diameter of which is 50 m, the rake arm 156 may be provided rotatably around the sewage introduction pipe 164 which stands upright from the mid portion of the basin through the central pit 140. Further, as shown in FIGS. 22 and 23, a rake arm 167 is arranged around a vertical shaft 166 and is provided at its leading end with a driven wheel 159. On the other hand, the vertical shaft 166 has an upper end provided with an induction cylinder 168 and a center well 169 so that they rotate together. A scum scraper arm 170 extending from the induction cylinder 168 has a leading end on which a driving source 171 is provided. The driving source 171 may be conveyable to the driven wheel 159 through a chain 172. Numeral 173 designates four connecting support columns which connect the arm 170 to the rake arm 167. Numeral 174 indicates a scum removing device.

Figure 28:
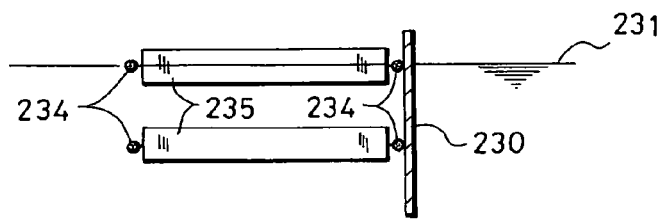
FIG. 28 is an enlarged sectional view taken along a line C—C in FIG. 26.

FIGS. 24 and 25 show another embodiment of the circular sedimentation basin. FIGS. 26 to 28 are enlarged views of the another embodiment. This basin has a pit 200 at its mid portion as shown in section in FIG. 25 and includes a bottom wall 201 moderately inclined and a peripheral wall 202 standing upright from the bottom wall 201. And it is further provided with a V-notched overflow weir 203 and a baffle plate 204 spaced apart from an inner peripheral side of the overflow weir 203.

The pit 200 has a mid portion provided with a base 205 on which a central pipe 206 stands up. A sanitary-sewage induction pipe 207 is inserted through the base 205 and the central pipe 206. As shown by an arrow (H) in FIG. 24, the sanitary sewage which flows in through the induction pipe 207 from an exterior area of the basin is made to flow out of an opening formed at an upper end of the central pipe 206. Numeral 208 designates a central support column.

The central pipe 206 is provided around its base with a rotor 210 vertically rotatable through radial bearings. The rotor 210 is supported on a base 205 rotatably by thrust bearings. The rotor 210 has rake arms 211, which project largely and radially from a peripheral portion of the rotor 210. The rake arm 211 is a light arm comprising four pipes and connection pipes for connecting these four pipes mutually. The rake arm 211 has a bottom surface on which such rakes as FIG. 17 shows them in plan are arranged and has a bottom portion on an inner peripheral side thereof provided with a rotor blade 212 which agitates the sludge to be flowed into the pit 200.

The rake arm 211 has the bottom surface at its leading end, attached to which is a frame 214 provided peripherally at its front and rear ends with driven wheels 213 as shown in FIG. 26. The rake arm 211 is provided at an upper portion of the inner peripheral side with an inner support column 215 made upright. The support column 215 is provided on a little bit radially outer side with an intermediate support column 217 for supporting a center well 216, which projects from the radially outer side. The rake arm 211 has a radially outer side provided with an external support column 218 made upright. A rotating base 219 is fixed onto the support column 218.

This base 219 makes a rotation movement along an inner side of the baffle plate 204. When the fitting base 219 comes to an inspection base 220 projecting from a specified position of a peripheral wall 202 to an inner periphery of the basin, it is possible to ride on an upper side thereof, which results in the possibility of conducting the maintenance work and the like. Installed on the fitting base 219 are a driving source 221 for scraping and collecting sludge, which drives the driven wheels 213 and a driving source 222 for scraping and forwarding scum. As shown in FIG. 25, a cable 226 on a rotation side is led from a power dispatching cable 224 with a guide rope, which extends between the central support column 208 and a support column 223 on an outer periphery, through a rotary power-conduction joint (slip ring) as shown by an arrow (Z) to the driving sources 221 and 222 through a rotating member, for example, the rake arm 211 and a scum scraper to be mentioned later.

Numeral 230 indicates the scum scraper, which has a section as shown in FIG. 28 and is a long plate-like member as illustrated in FIG. 26. Only an upper end portion of the scum scraper 230 makes the rotation movement in a direction indicated by an arrow (Q) in FIG. 24 while protruding out of the water surface 231. The scum scraper 230 is fixed at its one end of an inner peripheral side to the inner support column 215 and on the other hand, at its other end of an outer peripheral side to the outer supper column 218 so that it spans therebetween. Thus it scrapes and collects the scum on the water surface 231 forwardly by rotation.

Numerals 232 and 233 designate an inner sprocket and an outer sprocket, respectively. These are paired and are rotatable around a horizontal axis through the upper portions of the respective support columns 215 and 218 forwardly of the scum scraper 230. A pair of front and rear rotation interlocking members 234 are wrapped around these sprockets 232 and 233 and are continuously driven by the driving source 222 for scraping and forwarding the scum through a conduction means in a direction indicated by an arrow (Y) in FIG. 27.

There are arranged between the front and rear portions of these rotation interlocking members 234, scraping and forwarding members 235 each in the shape of a round shaft (or a rectangular shaft) as shown in FIG. 28 for floating members. As for the scraping and forwarding members 235, foam resin, wood, rubber tube and the like are utilized. The scum scraper 230, the rotation interlocking member 234, and the scraping and forwarding member 235 are made to pass through an opening passage 236 of the center well 216 and to also scrape and forward the scum within the center well 216 in the direction as indicated by the arrow (Y). Further, the driving source 221 and the driven wheels 213 are interlocked by a conveying means 237 such as a sprocket and a chain, as shown in FIG. 25. However, as in the above-mentioned embodiment, there is a case where an underwater driving source is directly arranged on the rake arms 211 to drive the driven wheel 213. Besides, the scum scraper 230 may be omitted from the present embodiment. Additionally, although the scraping and forwarding members 235 are arranged to return in the water, they may return above the water surface, (which is similarly applicable to the below-mentioned embodiments).

Furthermore, as shown in FIG. 24, a specific position of the baffle plate 204 is formed in the shape of a notch. Fixed to the notch is a scum recovery box 238 provided at its front surface with a gate 239 which opens and closes through a lever movement. The rotating external support column 218 kicks off the lever to open the gate 239 so as to induce the scum scraped and forwarded. The gate 239 is closed due to buoyancy or through a spring after having rotated.

The scum scraper 230 rotates in the direction indicated by the arrow (Q) in FIG. 24 to scrape and collect the scum in the basin. At the same time, the scraping and forwarding member 235 being driven in the direction indicated by the arrow (Y), the scum scraped and collected by the scum scraper 230 is scraped and forwarded in an outwardly and radially of the basin to be accumulated. And when it has arrived at the gate 239, the gate 239 opens to induce the scum into the scum recovery box 238, from which the scum is discharged as shown by an arrow (K) in FIG. 24. An arrow (J) in FIG. 24 indicates a direction where the pure supernatant water from the overflow weir is inducted outwards.

Figure 29:
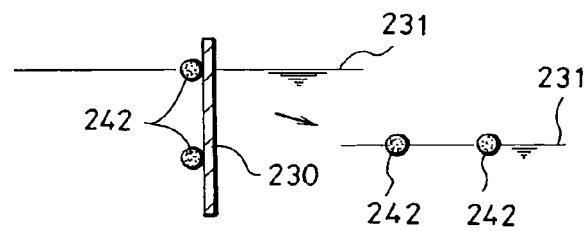
FIG. 29 is a sectional view showing another embodiment.
Figure 30:
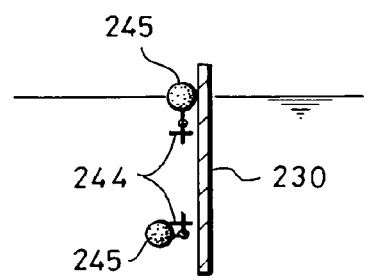
FIG. 30 is a sectional view showing another embodiment.

As for another embodiment, as shown in FIG. 29, the scraping and forwarding member 235 may be omitted. Instead, a scraping and forwarding member 242 may be composed only of a resin rope or the like things which float on the water. Besides, as shown in FIG. 30, a number of foam resin or the like scraping and forwarding members 245 may be attached to a link chain, a wire or the like rotation interlocking member 244 so as to perform the scraping and forwarding operation. It is to be noted that there is a case where the scum scraper 230 is omitted. Further, as shown at a right column of FIG. 29, the scraping and forwarding 242 may be adapted so as to circulate through a sprocket (or sheave) rotatable around a vertical axis while floating on the water surface. In this case, the left one comes to the scraping and forwarding side. The scum scraper 230 may be provided or omitted.

Figure 21:
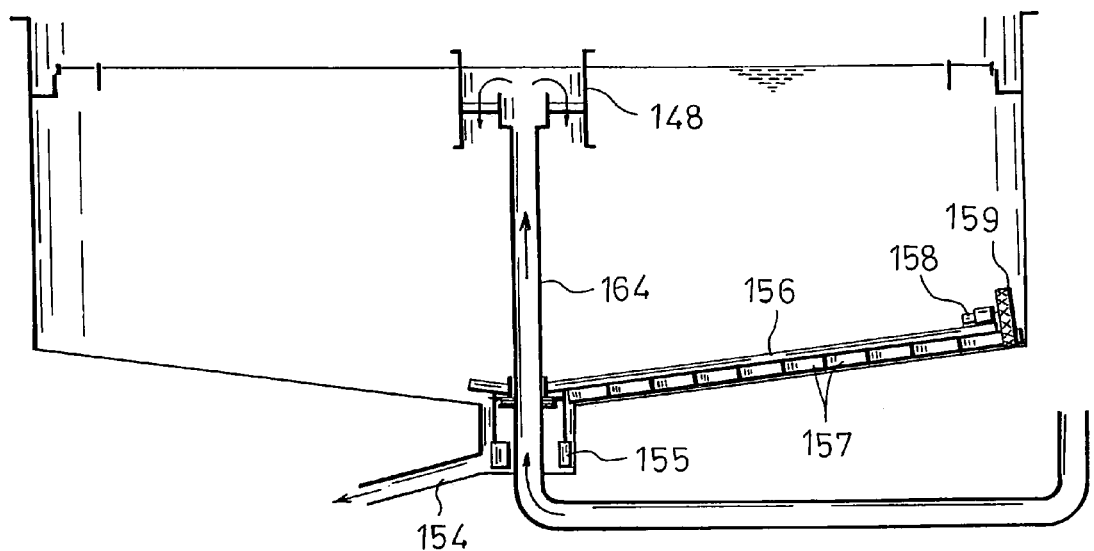
FIG. 21 is a vertical sectional view showing another embodiment of the sludge scraping and collecting apparatus for the circular sedimentation basin.
Figure 31:
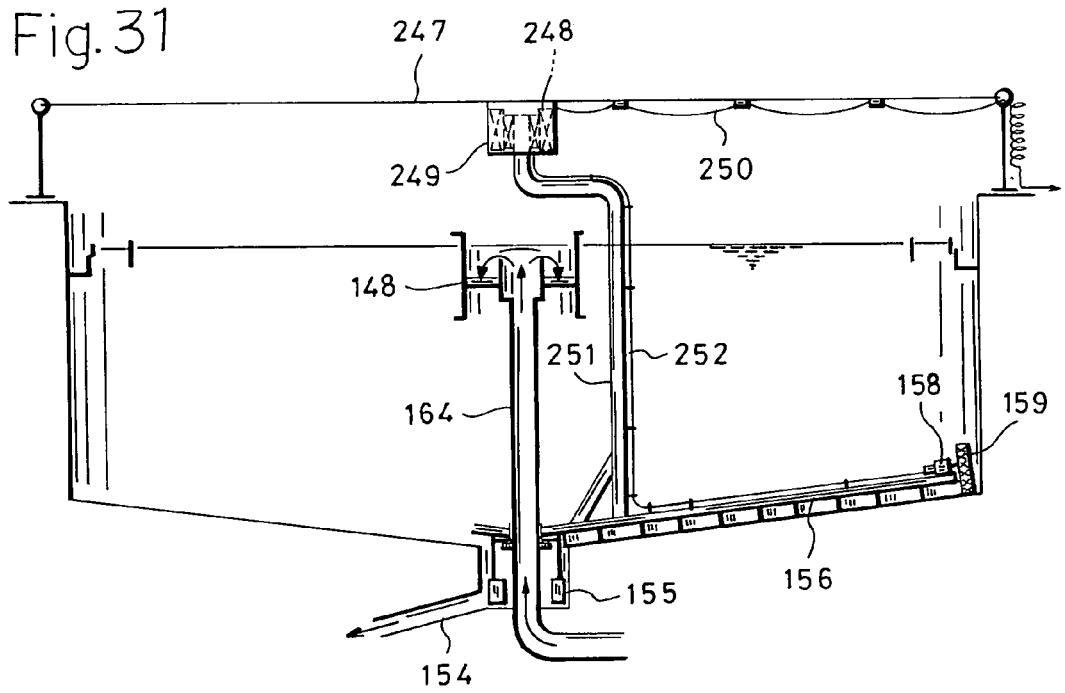
FIG. 31 is a schematic view which shows another example of a power dispatching device in the scraping and collecting apparatus for the circular sedimentation basin.

FIG. 31 shows another embodiment of the power dispatching system in the case of driving the driven wheel 159 by the underwater driving source 158 of the embodiment shown in FIG. 21. More specifically, numeral 247 designates an extending wire. The wire 247 has a mid portion fixedly provided with a joint cable 249 which houses a slip ring 248. The slip ring 248 has an outer periphery fixedly provided with a brush to which power can be dispatched through a power dispatching cable 250. There stands upright from the rake arm 156 a bent support column 251 formed in the shape of a crank and provided at its upper end with the rotatable brush of the slip spring 248. Further, the support column 251 is made rotatable. A power dispatching cable 252 on the rotation side, which is led through the support column 251 and the rake arm 156, can drive and control the driving source 158.

FIGS. 32 to 35 exemplify another embodiment which concerns an aeration reservoir (reaction reservoir) 300. Although the reservoir 300 has been already installed, it is a matter of course that a new one is applicable to this embodiment.

Figure 32:
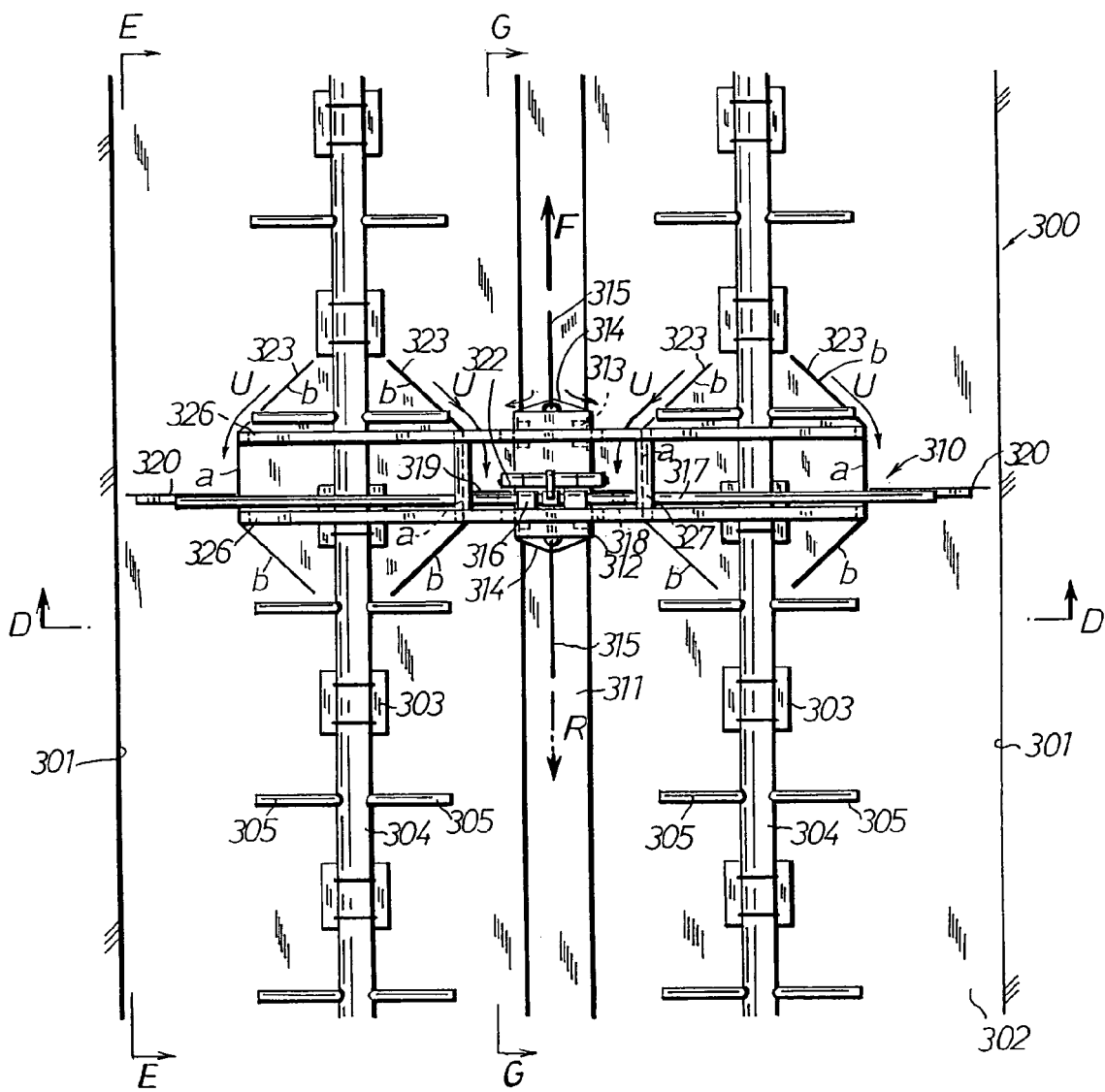
FIG. 32 is a plan view, in cross section in FIG. 33, showing another embodiment.
Figure 33:
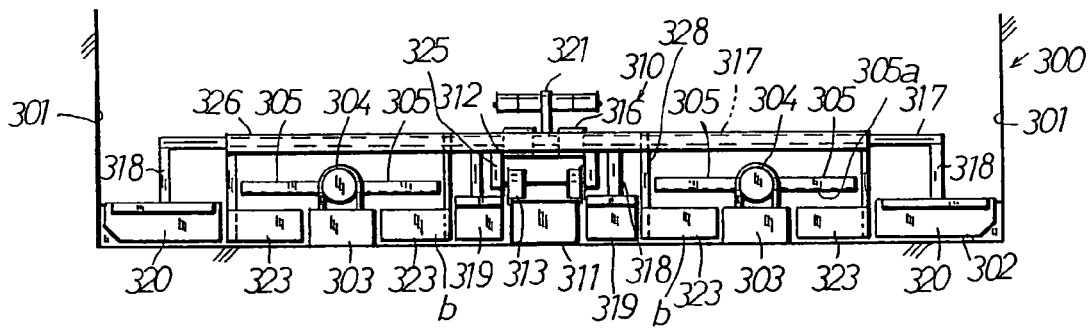
FIG. 33 is a sectional view taken along a line D—D in FIG. 32.

The reservoir 300 comprises left and right side walls 301, 301 shown in FIGS. 32 and 33 as well as upper and lower end walls corresponding to upper and lower portions of FIG. 32. It further comprises a bottom wall 302 shown in FIG. 33 to FIG. 35. As a whole it is formed in the shape of a rectangle.

A plurality of concrete pipe bases 303 are arranged on the bottom wall 302. These bases 303 are spaced apart at a predetermined interval on two lines parallel to the side wall 301. Fixed on to the bases 303 are main conduits 304, 304 in correspondence with the above-mentioned lines and in parallel to each other. Pressurized air is supplied from one end or both ends of each of these conduits 304.

A pair of air diffusing pipes 305 extend, at several portions in a longitudinal direction of each of the conduits 304, perpendicularly to the longitudinal direction and horizontally and communicate with the conduits 304, respectively. Each of these air diffusing pipes 305 has a longitudinal bottom surface provided with an air diffusing port 305a as shown in FIG. 33. And as shown in FIGS. 32 and 33, every air diffusing pipe 305 is spaced apart from the side wall 301 at a predetermined dimension. The air diffusing pipes opposing to each other in the left and right direction are spaced from one another at a predetermined dimension.

A various sorts of deposits, most of which is fine sand mud, precipitate on the bottom wall 302 within the aeration reservoir 300. Conventionally, it was impossible to constitute a removing (scraping) device which can effectively remove them. This is because the bottom area of the reservoir 300 is composed of the bases 303, the conduits 304 and the air diffusing pipes 305 which have become a large obstacle in constituting the removing device.

This embodiment has made it possible for a deposit (deposit sand) scraping and collecting device 310 to be installed by forming it as a specific one adapted to the existing air diffusing structure. Hereafter, the left and right direction in FIGS. 32 and 33 is regarded as a (reservoir) width direction. The deposit scraping and collecting device 310 advances and retreats vertically in FIG. 32 to scrape and collect the deposit. Therefore, in FIG. 32 an upward solid line arrow indicates a scraping and collecting direction (F) and a downward solid line arrow designates a return direction (R). Further, FIG. 33 shows the device 310 when seen from its rear surface.

The device 310 includes a guide rail 311 of monorail system as a relevant part. This embodiment employs for the guide rail 311, a rectangular pipe into which deposit does not enter. The guide rail 311 is arranged along a widthwise mid portion of the device 310 and fixed by anchors not shown.

There is a case where an H-shaped or an I-shaped steel is chosen for the guide rail 311. However, in that case, there is a probability of attaching another local scraper to the scraping and collecting device 310. Further, an end portion of the scraping and collecting direction (F) which corresponds to the upper portion in FIG. 32, is concaved to form a pit so as to fall down the scraped and collected deposits and remove therefrom or is arranged so as to remove them by vacuum directly without using the pit.

The device 310 is provided with a framework 312. The framework 312 is arranged to form a saddle with its groove directed downwardly. And the framework 312 is provided at its front and rear ends with a pair of left and right running wheels 313, respectively, which ride on the upper surface of the guide rail 311 so as to be rollable thereon. Each of the running wheels 313 is provided at its outer side with a flange in order not to run off the guide rail 311. Besides, although not shown, there is a case where the framework 312 is provided with a side roller which rotates around a vertical axis and keeps an orbit of the framework 312 proper by contacting the guide rail 311 from an exterior area. Further, there may be provided a float-up preventing roller, which controls the floating movement of the framework 312 constant and is arranged so as to be able to contact a horizontal flange (for example, an upper flange of the H-shaped steel) on the side of the guide rail 311 from below. The running wheels 313 may be in the shape of wide rollers and may comprise a pair of such rollers at the front and rear ends of the framework 312. The framework 312 has front and rear ends provided with rail scrapers 314 on the guide rail 311, which expels the deposits precipitated on the guide rail 311 outwards.

A sinuate member 315 composed of a wire rope, a link chain or the like is connected to each of the front and rear ends of the framework 312. This sinuate member 315 is of mono-wire type or mono-chain type. For example, it has one end connected to the front end of the framework 312 and has the other end connected to the rear end thereof while being connected to a driving source installed on the reservoir through a suitable sheave. Thus when the driving source is rotated normally or reversely, the framework 312 can be arranged to advance and retreat.

Figure 35:
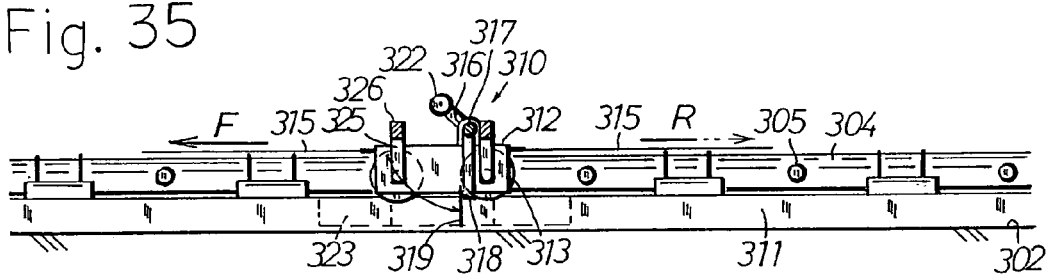
FIG. 35 is a sectional view taken along a line G—G in FIG. 32.

The framework 312 has an upper surface, as shown in FIGS. 33 and 35, set to a level higher than the main conduit 304. And it has a rear portion provided with a pair of left and right bearings 316 each of which has a center oriented widthwise. A single scraper shaft 317 passes through the bearings 316 to largely project in the left and right direction up to a front portion of each of the side walls 301. The scraper shaft 317 has projections which pass over all the main conduits 304 and the air diffusing pipes 305.

A plurality of suspending members 318 extend from the scraper shaft 317 as shown in FIG. 33. The suspending members 318 comprise some members slightly spaced apart from a center of the framework 312 on the opposite sides thereof and the others suspending from the opposite end portions of the scraper shaft 317. The some suspending members 318 have lower ends provided with first right and left scrapers 319 in pair and the other suspending members 318 have lower ends formed with second right and left scrapers 320 in pair.

Each of the scrapers 319 and 320 is rotated around the scraper shaft 317 to be switched over to an illustrated scraping and collecting position or to a forwardly and upwardly lifted return position and vice versa. For performing the switch-over, a lever 321 projects from a longitudinal mid portion of the scraper 317 and has an upper end provided with a weight 322 of a roller type. A center of gravity is changed over from a front portion of the weight 322 to a rear portion thereof or vice versa so as to switch over from the scraping and collecting position to the return position or vice versa. This change-over of the center of gravity is performed by the abutting of the weight 322 to fixed stoppers, which are opposed to the weight 322 and are arranged at the ends of the directions (R) and (F) in FIG. 32, ahead of the respective terminals of the advancement and the retreat.

Each of the first scrapers 319 may have so large a width that it spans between the central guide rail 311 and its opposite side base 303. Further, each of the second scrapers 320 may so large a width that it spans between the side wall 301 and the base 303. However, should they be so long that they come to below the air diffusing pipes 305, there appears a fear that they interfere the air diffusing pipes 305 along with their vertical movements. Therefore, each of the scrapers 319 and 320 is made to have a predetermined narrow width which always prevents it from interfering with them even if it vertically moves.

However, if each of the scrapers 319 and 320 is made to have a small width, as shown in FIG. 33, it cannot scrape and collect the deposits precipitated in a region below the air diffusing pipes 305. Accordingly, there are provided induction scrapers 323 which induce those deposits to the front surfaces of the scrapers 319 and 320. Each of the induction scrapers 323 comprises a main plate (a) which faces forward and rearward, and front and rear slant plates (b), (b) to form an arcuate shape.

The framework 312 has front and rear opposite sides to which stays 325 are fixed. Two front and rear horizontal bars 326, 326 are fixed onto the stays 325 so that they pass over the framework 312, the main conduits 304 and the air diffusing pipes 305. The horizontal bars 326 define a space reinforced by connection members 327 through which the scraper shaft 317 passes. Vertical bars 328 are fixed through these horizontal bars 326, thereby securing the induction scrapers 323, 323 to their lower ends, respectively.

FIGS. 32 to 35 show the deposits while they are scraped and collected in the direction (F). At this time, the air diffusing pipes may diffuse air or may stop diffusing air. Under this scraping and collecting condition, the respective scrapers 319 and 320 are regulated by vertical stoppers not shown as in FIGS. 34 and 35 so as not to escape rearwardly therefrom. The framework 312 is pulled in the direction (F). Although the scrapers 319 and 320 directly do not scrape nor collect the deposits staying in a region below a space defined in the front and rear direction by the air diffusing pipes 305, the induction scrapers 323 which pass through the region scrape out the deposits in directions indicated by arrows (U) (see FIG. 32) in an oblique direction and forward them to the front surfaces of the scrapers 319 and 320. As for the central first scraper 319, the deposit is regulated on its both sides by the guide rail 311 and the main plate (a) of the induction plate 323 to form a pocket-like shape which is scraped and collected forwardly by the first scraper 319. As for the second scraper 320, the deposit forms a pocket-like shape as well and is scraped and collected forwardly by the second scraper 320 while being prevented from escaping between the main plate (a) and the side wall 301. The deposits scraped and collected by the scrapers 319 and 320 are brought to a place where the pit or the suction means is present as shown at the upper portion in FIG. 32 and are disposed.

Figure 34:
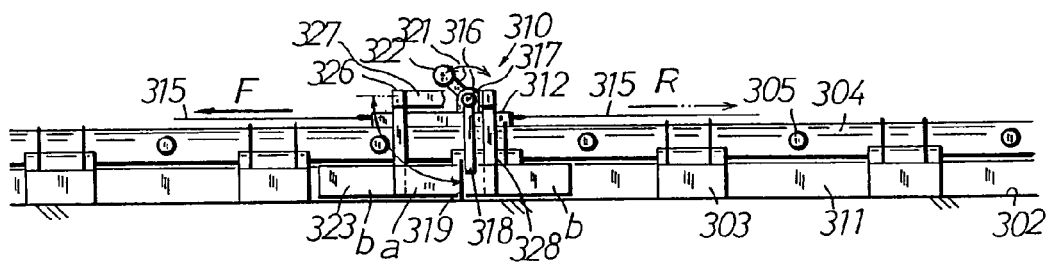
FIG. 34 is a sectional view taken along a line E—E in FIG. 32.

At the terminal of the scraping and collecting operation, the lever 321 is tilted rearwards and switched over by the butting of the weights 222 against the stoppers opposed thereto This enables the scrapers 319 and 320 to stand up as shown by arrows in FIGS. 34 and 35. In that state, the weight 322 is stopped by stoppers (not shown) while rotating and biasing in a right direction in FIGS. 34 and 35, thereby leading them to the return position. Next, the sinuate member 315 is pulled in the direction indicated by the arrow (R), thereby allowing the framework 312 to return with the scrapers 319 and 320 lifted up. At this time, the scrapers 319 and 320 do not scrape back the deposits. Although the induction scrapers 323 retreat as well, the deposits are induced along the slant plates (b) of these induction scrapers 323 from the rearward portion to the forward portion, and they are scraped and collected together with the collected deposits at the next scraping and collecting time and therefore is unlikely to be scraped back. At the end of the retreat, the deposits remain by an amount corresponding to the dimension of the rearward slant plates (b). This can be solved by arranging the return (lifted-up) positions of the scrapers 319 and 320 not in the forward direction but in the rearward direction (the direction (R)).

Each of the scrapers 319 and 320 is formed to have a narrow width so as to be able to attend to the regions other than the region below the air diffusing pipes 305. However, each of them may be formed to have so large a width that it can extend to the regions below the air diffusing pipes 305. However, the scrapers 319 and 320 should be timed so as not to interfere with the air diffusing pipes 305 when they are vertically switched over. Although the induction scrapers 323 are provided with the main plates (a), they are get rid of the main plates (a) and may have only front and rear slant plates (b) so as to form a V-shape in plan or to be curved in the shape of a capital letter (U) as a whole.

Figure 36:
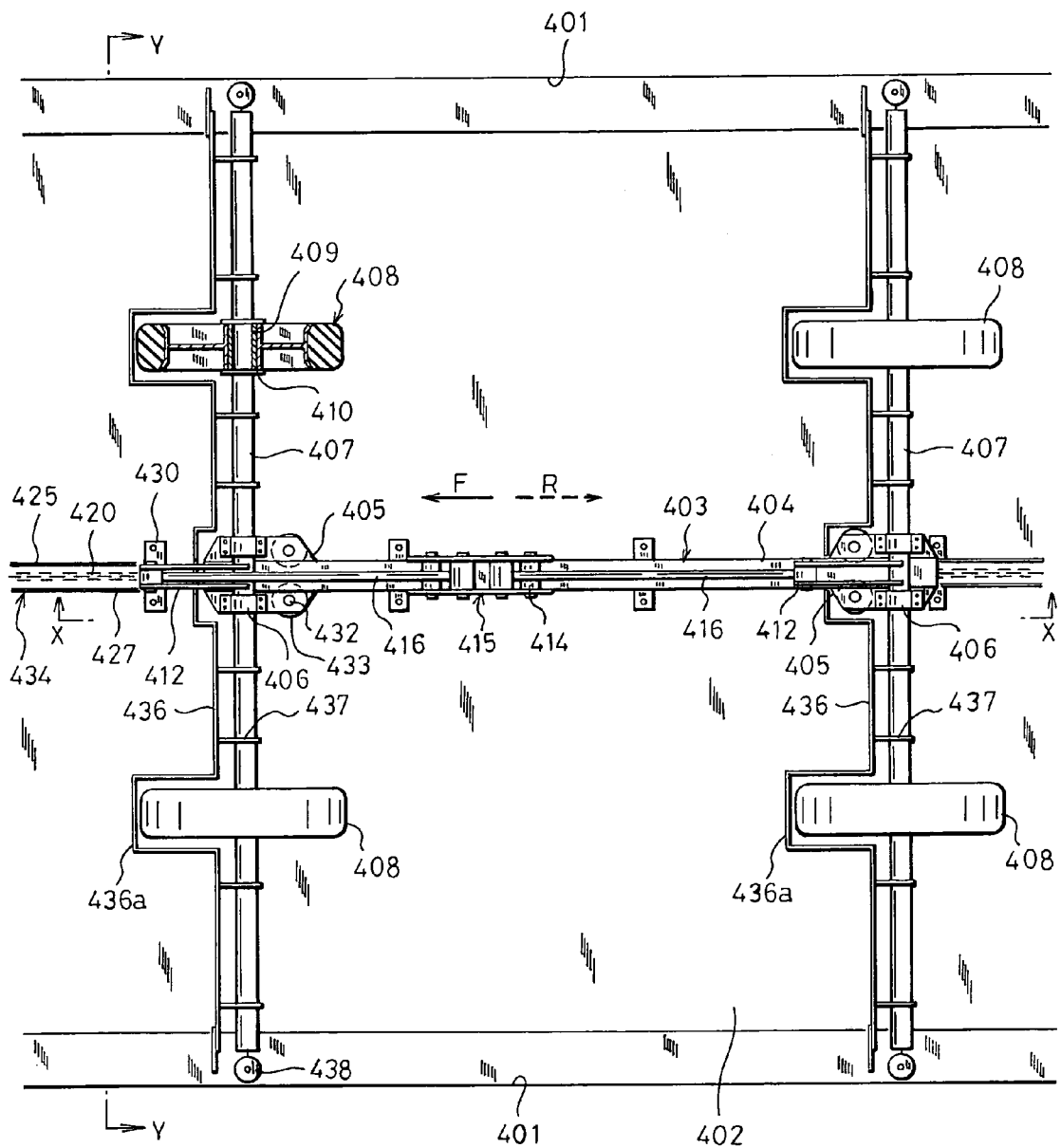
FIG. 36 is a plan view showing a scraping and collecting apparatus of another embodiment.
Figure 37:
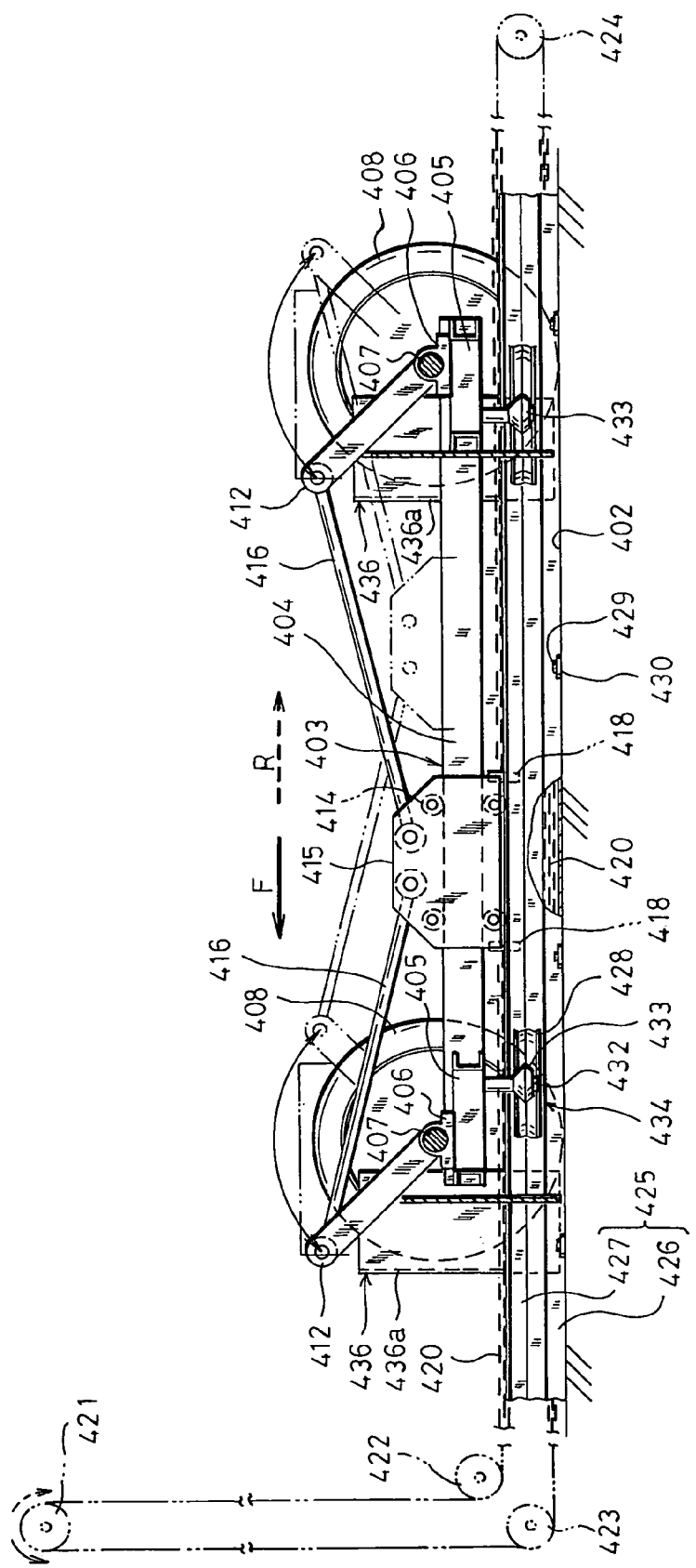
FIG. 37 is a sectional view taken along a line X—X of FIG. 36.
Figure 38:
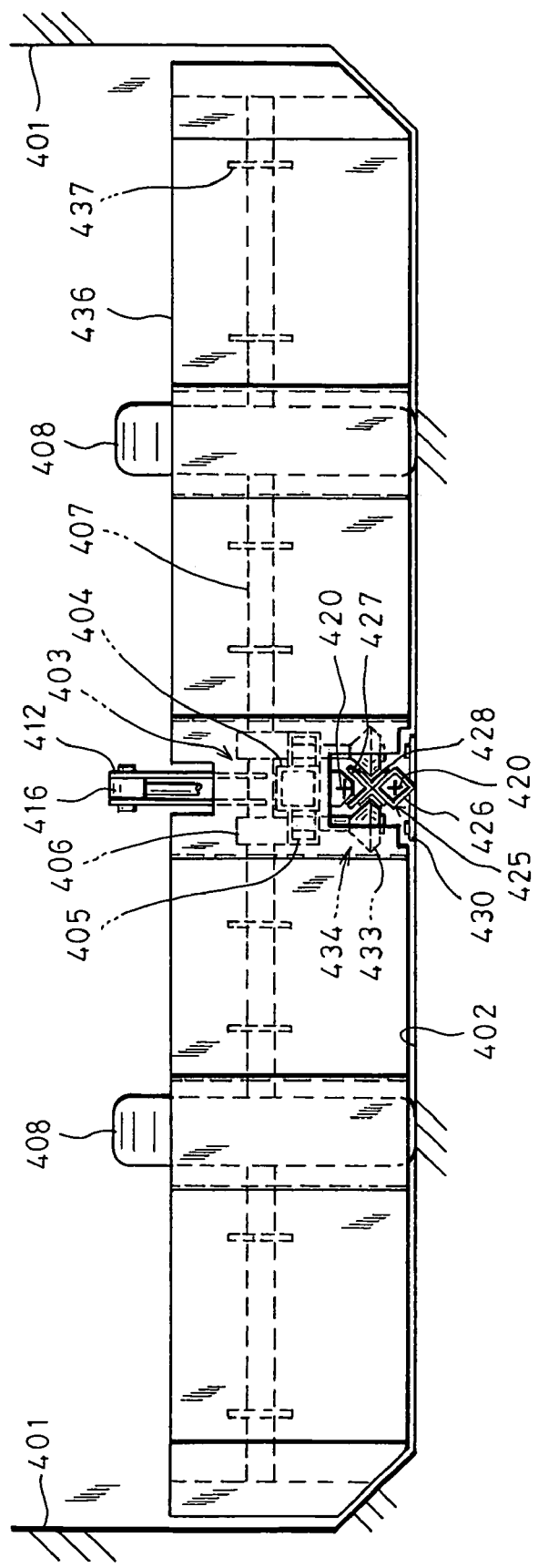
FIG. 38 is a sectional view taken along a line Y—Y of FIG. 36.

FIGS. 36 to 38 show a sludge scraping and collecting apparatus of other extremely simple type adapted so as to be applicable to a rectangular sedimentation basin. FIG. 37 shows a sectional view taken along a line X—X in FIG. 36. FIG. 38 is a sectional view taken along a line Y—Y in FIG. 36. In these Figures, side walls 401 are provided so as to mutually oppose in the right to left direction. The direction where these side walls 401 oppose to each other is regarded as a direction widthwise (a left and rear direction) of the basin and the direction perpendicular to the widthwise direction is taken as a direction longitudinal (a front and rear direction) of the basin. The opposing walls in the longitudinal direction are not illustrated, but the leftward one of FIGS. 36 and 37 is provided with a flow-straightening portion which introduces the sewage, in a porous form or the like. Formed downwards of the flow-straightening portion is a concaved pit (sludge pit). These are just as shown in FIGS. 10 and 11. A bottom 402 of the basin shown in FIG. 31 is inclined downwardly with a slight angle toward the left direction, although it may be difficult to see from this Figure.

Numeral 403 designates a carrier 403 which comprises a main body 404 formed from a single long rectangular pipe, side brackets 405 provided on the left and right opposite sides of each of the front and rear ends of the main body 404 and bearings 406 detachably attached onto the side brackets 405. The main body 404 has end portion which may be closed so as to prevent the sludge or the like from entering thereinto. Used for the main body 404 are a wide variety of members such as a round pipe, a channel steel and a mountain-shaped steel.

The bearings 406 are arranged in pair at the front end and the rear end while spaced apart from and opposed to each other in the left and right direction. A common shaft 407 passes through each of the front and rear paired bearings 406 and projects therefrom. The common shaft 407 is a little shorter than the width of the basin and may be formed in the shape of a pipe. Notably, there is a case where one of the front and rear common shafts is omitted. Running wheels 408 are provided so as to be able to rotate at positions spaced apart in the left and right direction of every common shaft 407. Each of the running wheels 408 is of solid type and is attached to the common shaft 407 through a bush 409 and plates 410 which prevents the removal of the side surfaces, so that it can rotate independently. This running wheel 408 is of solid type and may be provided at its tread portion with projections so as to prevent the slipping and to conduct the drain although no projection pattern is shown. A tube-less tire may be employed for the running wheel 408. Besides, an endless crawler may be wrapped over the front and rear running wheels 408. As for the running wheels 408, they are arranged in the number of only one on each of the left and right sides. But they may be arranged in plural number on each of the left and right sides. In this case, one of the plural running wheels has a larger diameter and each of the remaining ones may be an auxiliary wheel of a diameter slightly smaller than the larger diameter.

An interlocking levers 412 projects from an outer periphery of a portion corresponding to a space defined by the bearings 406 at the mid portion of each of the front and rear common shafts 407 so that they are formed in pair and can be switched over to either of a forwardly rising angle and a rearwardly rising angle. The carrier main body 404 has a body. Arranged around the body is a shifter 415, which comprises a pair of left and right plate members rollable by rollers 414, so that it can advance and retreat in the front and rear direction. An interlocking link 416 is connected to a space defined between the shifter 415 and each of the interlocking lever 412. Thus as shown in FIG. 37, when the shifter 415 advances and retreats, the front and rear interlocking levers 412 simultaneously swing in the front and rear direction.

The shifter 415 has a lower portion to front and rear ends of which chain anchors 418 are attached. A pulling and conveying means 420 of a link chain has every end portion to which the anchor 418 is attached. As shown by an imaginary line in FIG. 37, the pulling and conveying means 420 is wrapped over a driven wheel 421 so that its rotation direction is switch over to a normal one or to a reverse one and vice versa by a driving source provided above the basin but not shown. It is connected to the front chain anchor 418 through a first load sheave 422. The pulling and conveying means 420 passing over the driven wheel 421 is connected to the rear chain anchor 418 through a third load sheave 423 via a rear second load sheave 424. Here the pulling and conveying means 420 is passed in the form of upper and lower two members parallel to each other. These are guided by a next guide rail 425.

The guide rail 425 is shown in detail in FIG. 38. It comprises a lower guide 426 composed of a rectangular pipe and having a diagonal line made to become vertical, an upper guide 427 connected and fixed onto the lower guide 426 in the posture of a capital letter "V", lateral guide plates 428 connecting the upper guide 426 and the lower guide 427 to each other, and horizontal flanges 430 arranged in pair on each of the left and right sides to be fixed by anchors 429, all of which are formed into an integral structure.

The guide rail 425 has a rear end arranged in front of the second load sheave 424 in FIG. 37 and a front end positioned above the pit arranged on the side of the third load sheave 423. As such it is fixed along the center line of the width of the basin. While a lower circulating portion of the pulling and conveying means 420 smoothly advances and retreats within the lower guide 426 of the guide rail 425 without engaging the latter, an upper circulating portion of the pulling and conveying means 420 smoothly advances and retreats within the upper guide 427. Vertically cone-shaped and mutually opposed side rollers 433 are made to be rotatable around shafts 432 suspending from the side brackets 405. The side rollers 433 approach the side plates 428 so that they can be brought into contact therewith to form a means 434 for correcting the run-out in the left and right direction. The side rollers 433 may be in the form of circular dies.

On the other hand, numeral 436 designates a sludge scraper, which is attached to a front side of the common shaft 407 through a plurality of brackets 437 projecting therefrom. The scraper 436 comprises two parts. One front part is an integral single plate and the other rear part is composed of left and right portions to be separated from each other.

The sludge scraper 436 has a portion corresponding to a running wheel 408. As shown in FIG. 36, the portion is bent so that it forwardly projects to form a projection 436a. Numeral 438 indicates rollers at the opposite ends of the scraper 436 which constitute another system of the means for preventing the run-out in the left and right direction. Either of the guide rail 425 and the opposite rollers 438 or both of them form the means for preventing the run-out in the left and right direction. The reason why the rear part of the sludge scraper 436 is composed of the left and right separate portions is to prevent the rear interlocking link 416 from interfering with the front integral par of the scraper 436 if the latter were lifted up.

FIGS. 36 to 38 show the scraping and collecting condition where the scraper 436 is lowered to scrape and forward the sludge toward the pit. At this time, the driven wheel 421 in FIG. 37 is rotated in a direction indicated by a solid line arrow, thereby pulling the upper circulating portion of the pulling and conveying means 420 in the direction (F). The shifter 415 is stopped at a position illustrated by a solid line through a stopper not shown and the scraper 436 scrapes and collects the sludge while keeping its vertical position. This scraper 436 can stably and reliably scrape and collect owing to the fact that running wheels 408 arranged at four positions roll over the basin. In the event that they run out in the left and right direction, the side rollers 433 contact the guide rail 425 to correct the run-out. When the scraper 436 comes onto the pit and completes the scraping and collecting operation, the limit switch makes the driving source reversely rotate to switch over the rotation of the driven wheel 421 in a direction indicated by a broken line arrow. This allows the lower circulating portion and the upper circulating portion of the pulling and conveying means 420 to move in the direction (F) and in the direction (R), respectively. The shifter 415 is moved in the direction (R). Thus the both interlockingly moving levers 412 are rotated rearwardly as shown by an imaginary line to lift up the front and rear parts of the scraper to the return position. The pulling and conveying means 420 is continuously driven to stop the shifter 415 at an position indicated by an imaginary line upon butting the stopper not shown, thereby enabling the carrier 403 to be driven in the direction (R) to make a return movement.

When the carrier 403 has returned toward the direction (R), the limit switch detects the timing to switch over the rotation of the driven wheel to the direction indicated by the solid line arrow. This pulls the upper circulating portion of the pulling and conveying means 420 in the direction indicated by the arrow (F) to pull the shifter 415 to the stopper not shown. Meanwhile, the front and rear interlocking levers 412 are forwardly and interlockingly rotated through the interlockingly moving links 416 to rotate the common shafts 407 in the same direction. This switches over the scraper 436 lifted up as shown by the imaginary line to the vertical scraping and collecting position illustrated by the solid line. The pulling and conveying means 420 is continuously pulled in the direction indicated by the arrow (F) to pull the carrier 403 for scraping and collecting in the same direction.

Figure 39:
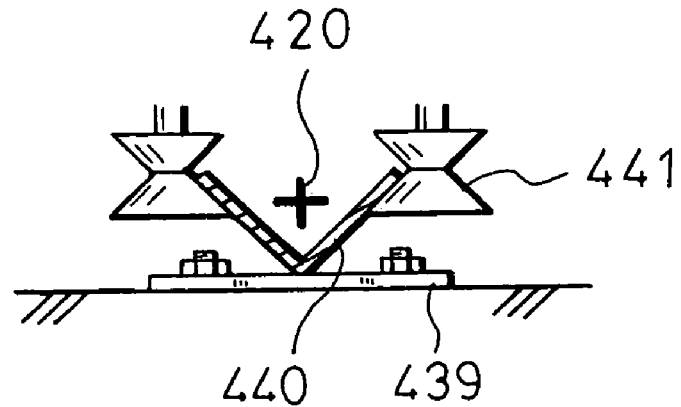
FIG. 39 is a sectional view showing another embodiment of a means for correcting the run-out in the left and right direction.
Figure 40:
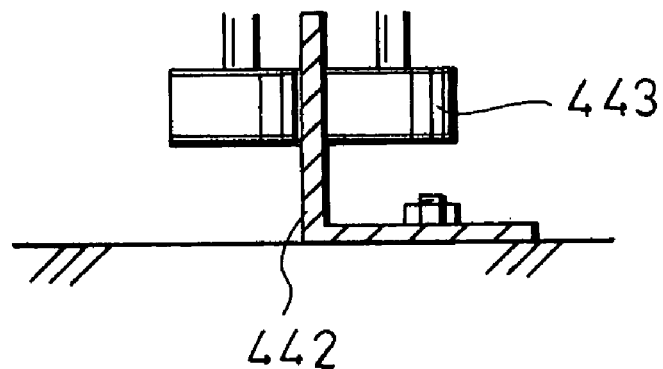
FIG. 40 is a sectional view showing another embodiment of the means for correcting the run-out in the left and right direction
Figure 41:
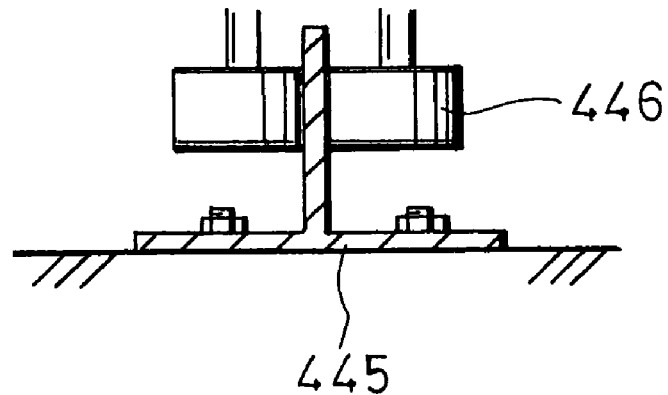
FIG. 41 is a sectional view showing another embodiment of the means for correcting the run-out in the left and right direction

In this embodiment, an independent driving system is formed for one sedimentation basin. However, for example, two scraping and collecting apparatuses are arranged in adjacent two basins to bring them into an interlockingly moving relationship by a single pulling and conveying means 420. These scraping and collecting apparatuses are interlockingly moved by a single driving source. Such one driving system of two basins is applicable to this embodiment. In this case, for example, as shown in FIG. 39, a guide rail 440 angle-shaped and provided at its bottom with a fixed flange 439 is laid on the bottom of the basin. The means for correcting the run-out in the left and right direction can be constituted only by arranging cone-shaped and mutually opposed side rollers 441 so as to contact the guide rail 440. The guide rail 440 may be a channel steel or a steel semi-circular in section. Further, as for another correcting means, an angle-shaped guide rail 442 is laid on the bottom surface of the basin and fixed directly by anchors and a side roller 443 is brought into being contactable with an upright side as shown in FIG. 40. Alternatively, the correcting means may be constituted by a guide rail 445 formed from a mountain-like steel,and a side roller 446. In addition, in the above-mentioned embodiment, although the common shaft 407 is arranged rotatable, it may be non-rotatably fixed to the carrier 403 and the running wheels 408 and the sludge scraper 436 may be arranged rotatable therearound, respectively and independently. Besides, the running wheels 408 are arranged to roll directly over the bottom 402 of the basin. But another rolling surface member is laid over the bottom surface and the running wheels may be arranged so as to roll over the another rolling surface member. Moreover, the common shaft 407 is provided with the running wheels 408 and the sludge scraper 436. There is a case where a shaft for the running wheel 408 is provided separately from a scraper shaft for the scraper 436. In this case, each of the shafts may be the alternative of the fixed-type and the rotatable-type. Besides, both are staggered in height so as to reinforce vertically and mutually. In the foregoing embodiment, the running wheels 408 are arranged at the front and rear ends in the total number of four but it may be arranged in the total number of three such that two wheels are at the front end and one wheel is at the rear end.

What is claimed is:

1. A sludge scraping and collecting apparatus which comprises a guide rail laid on a bottom of a processing basin, rectangular in plan, having side walls opposing to each other in a widthwise direction of the basin, front and rear end walls perpendicular to these side walls and spaced from each other in a longitudinal direction of the basin and one end at the front of the basin, which is provided with a pit, so as to pass through a mid portion between the both side walls in a longitudinal direction which is a front and rear direction, a carriage having a main body, an advancing and retreating slider and a sludge scraper arranged at least at a front end and a rear end of the carriage main body and provided on the guide rail so that it reciprocally runs in the front and rear direction through running wheels, the carriage main body having a body portion formed into a one-piece unit through which the advancing and retreating slider can be inserted and extending uniformly in the same section in the front and rear direction, the advancing and retreating slider being supported by the body portion of the carriage main body, so that it is guided to advance and retreat in the front and rear direction and enables the front and rear sludge scrapers to switch over their upper and lower rotation positions simultaneously when it advances and retreats, the sludge scraper being switchable over between a lowered scraping and collecting position where it scrapes and collects the sludge to be deposited on left and right sides of the guide rail, toward the pit and a lifted-up return position, the sludge scraped and collected forward by the rear scraper being scraped and collected further forward by the front scraper, thereby being scraped off into the pit, there being disposed above the processing basin a driving portion which continuously rotates a driven wheel and switches over its rotation direction to a normal one or a reverse one or vice versa, a pulling and conveying means wrapped around the driven wheel having one end connected to a front end portion of the advancing and retreating slider through a direction-conversion wheel fixed in the basin and having the other end connected to the rear end of the advancing and retreating slider through another direction-conversion wheel arranged at the rear end of the guide rail after it extends from the direction-conversion wheel fixed in the basin and passes through the guide rail, the driven wheel being driven for rotating in one direction to switch over the sludge scrapers to either of upper and lower rotation positions through the pulling and conveying means and then driving the carriage for conveying the latter forwardly or rearwardly, wherein the carriage main body has front and rear end portions to which receiving boards with bearing pedestals projecting from both of the left and right sides of the carriage main body horizontally are fixed, a pair of left and right bearings being spaced apart on the respective bearing pedestals of the receiving boards detachably with its axis directed in the widthwise direction of the basin, and these bearings are provided with a rotary shaft having outwardly projecting both ends onto which scraper pipes as base shafts for the sludge scrapers are externally fitted so that they are inserted thereonto and removed therefrom so as to form a pair in the left and right direction and are fixed by attaching means.

2. The sludge scraping and collecting apparatus as set forth in claim 1, wherein the sludge scraper has a vertical height within a range of 150 mm to 400 mm and adjustable so as to meet a deposit state of the sludge in the processing basin.

3. The sludge scraping and collecting apparatus as set forth in claim 1, wherein the front and rear sludge scrapers defines a longitudinal space therebetween in which an auxiliary scraper is arranged.

4. The sludge scraping and collecting apparatus as set forth in claim 1, wherein a support is made to stand up from the carriage side and a scum scraping and collecting plate which scrapes and collects scum on the water in one direction is provided through an upper end of the support so that it floats and sinks.

* * * * *